(12) United States Patent
Fukumori

(10) Patent No.: US 10,794,452 B2
(45) Date of Patent: Oct. 6, 2020

(54) BICYCLE CHAIN

(71) Applicant: SHIMANO INC., Sakai (JP)

(72) Inventor: Tsuyoshi Fukumori, Sakai (JP)

(73) Assignee: SHIMANO INC., Sakai (JP)

( * ) Notice: Subject to any disclaimer, the term of this patent is extended or adjusted under 35 U.S.C. 154(b) by 301 days.

(21) Appl. No.: 15/946,733

(22) Filed: Apr. 6, 2018

(65) Prior Publication Data

US 2019/0309826 A1   Oct. 10, 2019

(51) Int. Cl.
*F16G 13/06* (2006.01)
*F16G 15/04* (2006.01)

(52) U.S. Cl.
CPC .............. *F16G 13/06* (2013.01); *F16G 15/04* (2013.01)

(58) Field of Classification Search
CPC .......... F16G 13/06; F16G 13/04; B62M 9/10; C21D 9/0087; B21L 9/065
USPC .......................................................... 474/206
See application file for complete search history.

(56) References Cited

U.S. PATENT DOCUMENTS

| | | | | |
|---|---|---|---|---|
| 4,978,327 A * | 12/1990 | Wu | .......................... | F16G 13/06 474/228 |
| 5,291,730 A * | 3/1994 | Wu | .......................... | F16G 15/00 474/220 |
| 5,741,196 A * | 4/1998 | Campagnolo | ............ | B62M 9/10 474/206 |
| 6,110,064 A * | 8/2000 | Guichard | ................ | F16G 13/06 474/230 |
| 7,427,251 B2 * | 9/2008 | Reiter | ..................... | F16G 13/06 474/206 |
| 7,931,405 B2 * | 4/2011 | Fujiwara | ................... | C23C 8/22 384/276 |
| 8,146,340 B2 * | 4/2012 | Shimada | ................. | F16G 13/06 474/206 |
| 9,541,159 B2 * | 1/2017 | Wang | ...................... | F16G 13/06 |
| 10,371,234 B2 * | 8/2019 | Civiero | .................... | B62M 9/10 |
| 2002/0031687 A1 * | 3/2002 | Wang | ........................ | C23C 8/22 428/698 |

(Continued)

FOREIGN PATENT DOCUMENTS

| CN | 2588129 Y | 11/2003 |
|---|---|---|
| CN | 102829135 | 12/2012 |

(Continued)

*Primary Examiner* — Henry Y Liu
(74) *Attorney, Agent, or Firm* — Mori & Ward, LLP

(57) ABSTRACT

A bicycle chain comprises an inner link plate. The inner link plate comprises a first inner-link end portion, a second inner-link end portion, an inner-link intermediate portion, a first chromized layer, and a second chromized layer. The first inner-link end portion includes a first inner-link opening and a first axially extending surface. The second inner-link end portion includes a second inner-link opening and a second axially extending surface. The first chromized layer has a first maximum axially chromized-treatment length defined in the first axially extending surface in an axial direction. The second chromized layer has a second maximum axially chromized-treatment length defined in the second axially extending surface in the axial direction. Each of the first maximum axially chromized-treatment length and the second maximum axially chromized-treatment length is equal to or larger than 1.1 mm.

28 Claims, 14 Drawing Sheets

(56) References Cited

U.S. PATENT DOCUMENTS

| | | | | |
|---|---|---|---|---|
| 2002/0072444 A1* | 6/2002 | Matsuno | ............... | F16G 13/04 474/215 |
| 2003/0121794 A1* | 7/2003 | Horsthemke | ............ | C25D 3/10 205/243 |
| 2005/0020394 A1* | 1/2005 | Valle | ....................... | B62M 9/00 474/155 |
| 2005/0082139 A1* | 4/2005 | Ishikawa | ............... | C10M 133/06 192/107 M |
| 2005/0164816 A1* | 7/2005 | Wang | ..................... | F16G 13/06 474/234 |
| 2005/0176539 A1* | 8/2005 | Hirschmann | ........... | F16G 13/06 474/228 |
| 2008/0015072 A1* | 1/2008 | Nagao | ..................... | F16G 13/06 474/206 |
| 2008/0047633 A1* | 2/2008 | Kizawa | .................... | C23C 8/22 148/233 |
| 2008/0273827 A1* | 11/2008 | Fujiwara | .................. | C23C 8/72 384/625 |
| 2008/0280716 A1* | 11/2008 | Miyazawa | ............. | F16G 13/06 474/206 |
| 2011/0044572 A1* | 2/2011 | Kano | .................... | C23C 28/046 384/625 |
| 2011/0285091 A1* | 11/2011 | Wodrich | ................ | B62D 55/15 277/377 |
| 2012/0322599 A1* | 12/2012 | Oishi | ...................... | F16G 13/06 474/230 |
| 2014/0141912 A1* | 5/2014 | Baba | ....................... | F16G 13/06 474/206 |
| 2015/0094180 A1 | 4/2015 | Fukumoir et al. | | |
| 2015/0273729 A1* | 10/2015 | Buchholtz | ................ | B27B 33/14 83/830 |
| 2016/0153525 A1* | 6/2016 | Eda | ........................ | C22C 38/02 474/228 |
| 2016/0153526 A1* | 6/2016 | Wang | ..................... | F16G 13/06 474/226 |
| 2017/0138439 A1* | 5/2017 | Civiero | .................... | F16G 13/06 474/228 |
| 2017/0234404 A1* | 8/2017 | Ludecke | ................ | F16G 13/06 474/231 |
| 2018/0283497 A1* | 10/2018 | Ebinuma | ................ | F16G 13/04 |
| 2019/0011037 A1* | 1/2019 | Iwai | ........................ | B62M 9/105 |

FOREIGN PATENT DOCUMENTS

| | | |
|---|---|---|
| CN | 104512519 | 4/2015 |
| CN | 206782657 U | 12/2017 |
| JP | 57-085967 | 5/1982 |

\* cited by examiner

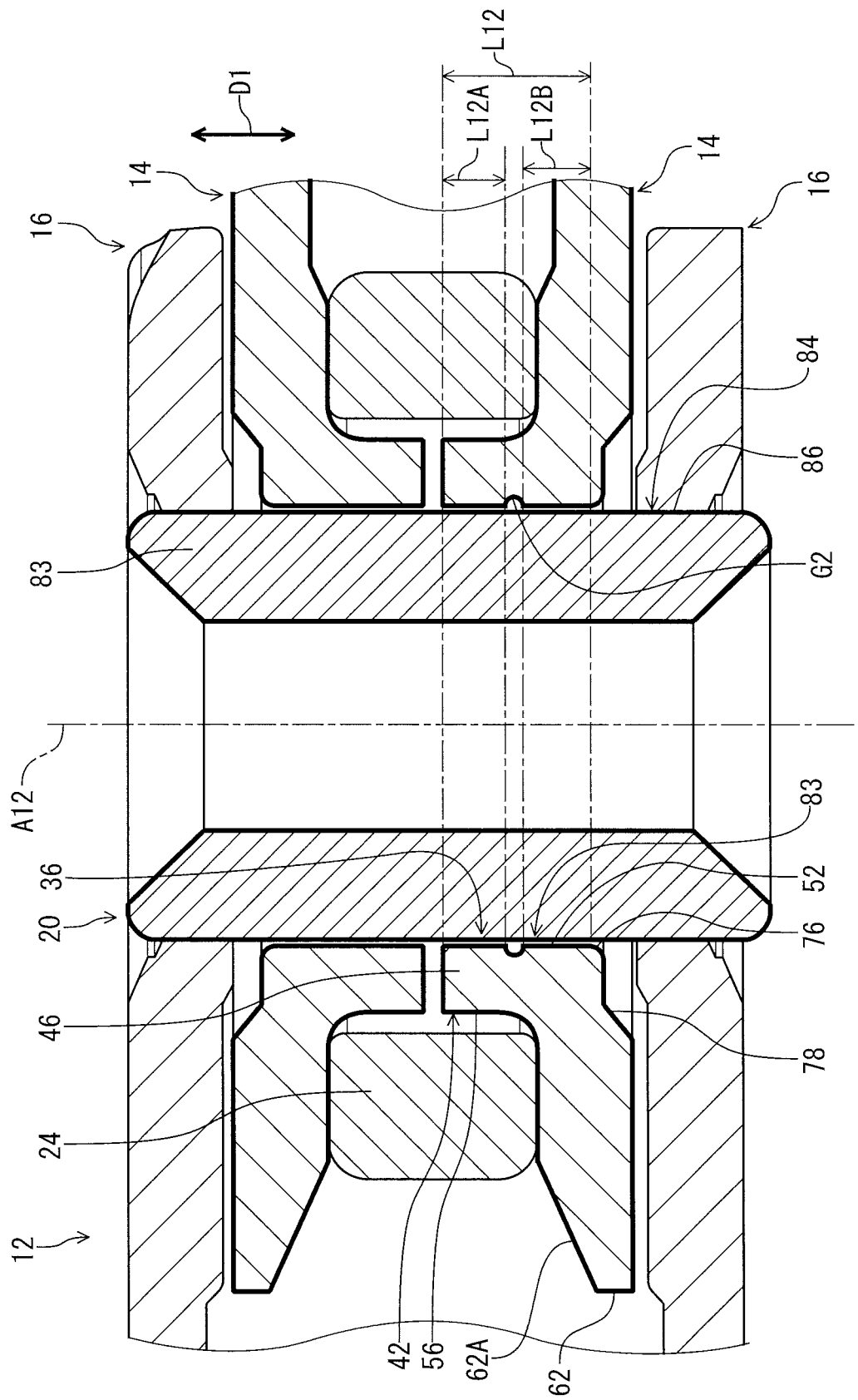

BICYCLE CHAIN

BACKGROUND OF THE INVENTION

Field of the Invention

The present invention relates to a bicycle chain.

Discussion of the Background

Japanese Unexamined Patent Application Publication No. S57-085967 describes a chain.

SUMMARY OF THE INVENTION

In accordance with a first aspect of the present invention, a bicycle chain comprises an inner link plate. The inner link plate has a longitudinal centerline and a transverse centerline perpendicular to the longitudinal centerline. The inner link plate comprises a first inner-link end portion, a second inner-link end portion, an inner-link intermediate portion, a first chromized layer, and a second chromized layer. The first inner-link end portion includes a first inner-link opening and a first axially extending surface. The first inner-link opening has a first inner-link center axis. The first axially extending surface circumferentially surrounds the first inner-link opening with respect to the first inner-link center axis. The first axially extending surface extends parallel to the first inner-link center axis and is configured to slide relative to a first chain pin of the bicycle chain in an assembled state of the bicycle chain. The second inner-link end portion includes a second inner-link opening and a second axially extending surface. The second inner-link opening has a second inner-link center axis parallel to the first inner-link center axis. The second axially extending surface circumferentially surrounds the second inner-link opening with respect to the second inner-link center axis. The second axially extending surface extends parallel to the second inner-link center axis and is configured to slide relative to a second chain pin of the bicycle chain in the assembled state of the bicycle chain. The inner-link intermediate portion interconnects the first inner-link end portion and the second inner-link end portion. The first chromized layer is provided to the first axially extending surface to slide relative to the first chain pin of the bicycle chain in the assembled state of the bicycle chain. The first chromized layer has a first maximum axially chromized-treatment length defined in the first axially extending surface in an axial direction with respect to at least one of the first inner-link center axis and the second inner-link center axis. The second chromized layer is provided to the second axially extending surface to slide relative to the first chain pin of the bicycle chain in the assembled state of the bicycle chain. The second chromized layer has a second maximum axially chromized-treatment length defined in the second axially extending surface in the axial direction. Each of the first maximum axially chromized-treatment length and the second maximum axially chromized-treatment length is equal to or larger than 1.1 mm.

With the bicycle chain according to the first aspect, the first chromized layer improves wear resistance of the first axially extending surface configured to slide relative to the first chain pin, and the second chromized layer improves wear resistance of the second axially extending surface configured to slide relative to the second chain pin. Thus, it is possible to improve wear resistance of the bicycle chain.

In accordance with a second aspect of the present invention, a bicycle chain comprises an inner link plate. The inner link plate has a longitudinal centerline and a transverse centerline perpendicular to the longitudinal centerline. The inner link plate comprises a first inner-link end portion, a second inner-link end portion, and an inner-link intermediate portion. The first inner-link end portion includes a first inner-link opening and a first axially extending surface. The first inner-link opening has a first inner-link center axis. The first axially extending surface circumferentially surrounds the first inner-link opening with respect to the first inner-link center axis. The first axially extending surface extends parallel to first inner-link center axis and is configured to slide relative to a first chain pin of the bicycle chain in an assembled state of the bicycle chain. The second inner-link end portion includes a second inner-link opening and a second axially extending surface. The second inner-link opening has a second inner-link center axis parallel to the first inner-link center axis. The second axially extending surface circumferentially surrounds the second inner-link opening with respect to the second inner-link center axis. The second axially extending surface extends parallel to first inner-link center axis and is configured to slide relative to a second chain pin of the bicycle chain in the assembled state of the bicycle chain. The inner-link intermediate portion interconnects the first inner-link end portion and the second inner-link end portion. Each of the first axially extending surface and the second axially extending surface having a surface length equal to or larger than 1.1 mm and surface hardness equal to or larger than 800 HV.

With the bicycle chain according to the second aspect, the surface hardness improves wear resistance of the first axially extending surface and the second axially extending surface which are respectively configured to slide relative to the first chain pin and the second chain pin. Thus, it is possible to improve wear resistance of the bicycle chain.

In accordance with a third aspect of the present invention, the bicycle chain according to the first aspect is configured so that at least one of the first maximum axially chromized-treatment length and the second maximum axially chromized-treatment length ranges from 1.2 mm to 1.32 mm.

With the bicycle chain according to the third aspect, the at least one of the first maximum axially chromized-treatment length and the second maximum axially chromized-treatment length allows the bicycle chain to apply to a multiple sprocket having eleven or more (e.g., twelve) sprocket wheels with improving wear resistance of the bicycle chain.

In accordance with a fourth aspect of the present invention, the bicycle chain according to the first aspect is configured so that at least one of the first maximum axially chromized-treatment length and the second maximum axially chromized-treatment length ranges from 1.3 mm to 1.42 mm.

With the bicycle chain according to the fourth aspect, the at least one of the first maximum axially chromized-treatment length and the second maximum axially chromized-treatment length allows the bicycle chain to apply to a multiple sprocket having eleven or more (e.g., eleven) sprocket wheels with improving wear resistance of the bicycle chain.

In accordance with a fifth aspect of the present invention, the bicycle chain according to the first, third, or fourth aspect is configured so that the first inner-link end portion includes a third axially extending surface circumferentially surrounding the first inner-link opening with respect to the first inner-link center axis. The third axially extending surface is disposed radially outwardly from the first axially extending surface with respect to the first inner-link center axis and is configured to slide relative to a first chain roller of the bicycle chain in the assembled state of the bicycle chain. The second inner-link end portion includes a fourth axially extending surface circumferentially surrounding the second inner-link opening with respect to the second inner-link center axis. The fourth axially extending surface is disposed radially outwardly from the second axially extending surface with respect to the second inner-link center axis and is configured to slide relative to a second chain roller of the bicycle chain in the assembled state of the bicycle chain. The inner link plate comprises a third chromized layer and a fourth chromized layer. The third chromized layer is provided to the third axially extending surface to slide relative to the first chain roller of the bicycle chain in the assembled state of the bicycle chain. The fourth chromized layer is provided to the fourth axially extending surface to slide relative to the second chain roller of the bicycle chain in the assembled state of the bicycle chain.

With the bicycle chain according to the fifth aspect, the third chromized layer improves wear resistance of the third axially extending surface configured to slide relative to the first chain roller, and the fourth chromized layer improves wear resistance of the fourth axially extending surface configured to slide relative to the second chain roller. Thus, it is possible to further improve wear resistance of the bicycle chain.

In accordance with a sixth aspect of the present invention, the bicycle chain according to the fifth aspect is configured so that a chromized layer including the first chromized layer, the second chromized layer, the third chromized layer and the fourth chromized layer is provided to entirety of the inner link plate.

With the bicycle chain according to the sixth aspect, it is possible to improve efficiency of a chromizing process.

In accordance with a seventh aspect of the present invention, the bicycle chain according to any one of the first to sixth aspects is configured so that the first inner-link end portion has a first longitudinally elongated edge in a longitudinal direction with respect to the longitudinal centerline, the first longitudinally elongated edge extending in a first longitudinal direction defined from the second inner-link end portion toward the first inner-link end portion. The first longitudinally elongated edge is configured to support a first sprocket tooth of a bicycle sprocket in the axial direction in an engagement state in which the first sprocket tooth positioned in an outer link space defined between a pair of outer link plates of the bicycle chain.

With the bicycle chain according to the seventh aspect, the first longitudinally elongated edge reduces falling-off of the bicycle chain from the bicycle sprocket.

In accordance with an eighth aspect of the present invention, the bicycle chain according to the seventh aspect is configured so that the first inner-link end portion has a pair of first linear edges extending parallel to each other in the longitudinal direction so that the first longitudinally elongated edge is disposed between the pair of first linear edges in a first circumferential direction with respect to the first inner-link center axis.

With the bicycle chain according to the eighth aspect, the first longitudinally elongated edge and the pair of first linear edges reduce falling-off of the bicycle chain from the bicycle sprocket with maintaining gear change performance.

In accordance with a ninth aspect of the present invention, the bicycle chain according to the seventh or eighth aspect is configured so that the first longitudinally elongated edge has a first chamfered portion that is configured to face the first sprocket tooth in the axial direction in the engagement state.

With the bicycle chain according to the ninth aspect, the first chamfered portion reduces excessive interference between the first longitudinally elongated edge and the first sprocket teeth. This improves the gear change performance with reducing the falling-off of the bicycle chain from the bicycle sprocket.

In accordance with a tenth aspect of the present invention, the bicycle chain according to any one of the seventh to ninth aspects is configured so that the first longitudinally elongated edge has a first curvature radius that is larger than a curvature radius of the first inner-link opening.

With the bicycle chain according to the tenth aspect, the first longitudinally elongated edge further reduces falling-off of the bicycle chain from the bicycle sprocket.

In accordance with an eleventh aspect of the present invention, the bicycle chain according to any one of the first to tenth aspect is configured so that the second inner-link end portion has a second longitudinally elongated edge in a longitudinal direction with respect to the longitudinal centerline, the second longitudinally elongated edge extending in a second longitudinal direction defined from the first inner-link end portion toward the second inner-link end portion. The second longitudinally elongated edge is configured to support a second sprocket tooth of a bicycle sprocket in the axial direction in an engagement state in which the second sprocket tooth is positioned in an outer link space defined between a pair of outer link plates of the bicycle chain.

With the bicycle chain according to the eleventh aspect, the second longitudinally elongated edge reduces falling-off of the bicycle chain from the bicycle sprocket.

In accordance with a twelfth aspect of the present invention, the bicycle chain according to the eleventh aspect is configured so that the second inner-link end portion has a pair of second linear edges extending parallel to each other in the longitudinal direction so that the second longitudinally elongated edge is disposed between the pair of second linear edges in a second circumferential direction with respect to the second inner-link center axis.

With the bicycle chain according to the twelfth aspect, the second longitudinally elongated edge and the pair of second linear edges reduce falling-off of the bicycle chain from the bicycle sprocket with maintaining gear change performance.

In accordance with a thirteenth aspect of the present invention, the bicycle chain according to the eleventh or twelfth aspect is configured so that the second longitudinally elongated edge has a second chamfered portion that is configured to face the second sprocket tooth in the axial direction in the engagement state.

With the bicycle chain according to the thirteenth aspect, the second chamfered portion reduces excessive interference between the second longitudinally elongated edge and the second sprocket teeth. This improves the gear change performance with reducing the falling-off of the bicycle chain from the bicycle sprocket.

In accordance with a fourteenth aspect of the present invention, the bicycle chain according to any one of the eleventh to thirteenth aspects is configured so that the second longitudinally elongated edge has a second curvature radius that is larger than a curvature radius of the second inner-link opening.

With the bicycle chain according to the fourteenth aspect, the second longitudinally elongated edge further reduces falling-off of the bicycle chain from the bicycle sprocket.

In accordance with a fifteenth aspect of the present invention, the bicycle chain according to any one of the first to fourteenth aspects is configured so that the inner link plate has a first inner-link surface and a second inner-link surface opposite to the first inner-link surface in the axial direction. The first inner-link surface configured to face an axially pairing inner link plate in the axial direction in the assembled state of the bicycle chain. An axial recess is provided to the inner-link intermediate portion in the first inner-link surface.

With the bicycle chain according to the fifteenth aspect, the axial recess creates a necessary space between the opposed pair of inner link plates when a distance between the opposed pair of inner link plates decreases for a multiple sprocket assembly.

In accordance with a sixteenth aspect of the present invention, the bicycle chain according to the fifteenth aspect is configured so that the first inner-link end portion has a first axial width defined in the axial direction. The second inner-link end portion has a second axial width defined in the axial direction. The inner-link intermediate portion has an intermediate axial width defined in the axial direction. The axial recess is configured so that the intermediate axial width is smaller than each of the first axial width and the second axial width.

With the bicycle chain according to the sixteenth aspect, the axial recess certainly creates a necessary space between the opposed pair of inner link plates when a distance between the opposed pair of inner link plates decreases for a multiple sprocket assembly.

In accordance with a seventeenth aspect of the present invention, the bicycle chain according to the sixteenth aspect is configured so that the first axial width is identical with the second axial width.

With the bicycle chain according to the seventeenth aspect, it is possible to make an outward surface of the inner link plate flat. This improves gear change performance.

In accordance with an eighteenth aspect of the present invention, the bicycle chain according to any one of the fifteenth to seventeenth aspects is configured so that the second inner-link surface is flat at least except peripheries of the first inner-link opening and the second inner-link opening.

With the bicycle chain according to the eighteenth aspect, it is possible to improve gear change performance.

In accordance with a nineteenth aspect of the present invention, the bicycle chain according to any one of the fifteenth to eighteenth aspects is configured so that the axial recess has an axial depth defined in the axial direction between the first inner-link surface in the inner-link intermediate portion and the first inner-link surface in at least one of the first inner-link end portion and the second inner-link end portion. The axial depth ranges from 0.1 mm to 0.2 mm.

With the bicycle chain according to the nineteenth aspect, the axial depth creates a necessary space between the opposed pair of inner link plates with maintaining necessary rigidity of the inner link plate.

In accordance with a twentieth aspect of the present invention, the bicycle chain according to any one of the first to nineteenth aspects further comprises an outer link plate and a chain pin. The outer link plate is free of a chromized layer. The chain pin is fixed to the outer link plate and comprises a pin body and a pin chromized layer. The pin body has a pin surface configured to slide relative to the inner link plate in the assembled state of the bicycle chain. The pin chromized layer is provided to the pin surface of the chain pin to slide relative to the inner link plate in the assembled state of the bicycle chain.

With the bicycle chain according to the twentieth aspect, the pin chromized layer improves wear resistance of the chain pin while the outer link plate free of a chromized layer improves productivity of the bicycle chain.

In accordance with a twenty-first aspect of the present invention, the bicycle chain according to any one of the first to twentieth aspects further comprises a connecting link plate and a connecting-link pin. The connecting link plate is free of a chromized layer. The connecting link plate includes a first connecting-link end portion, a second connecting-link end portion, and a connecting-link intermediate portion. The first connecting-link end portion includes an elongated opening that includes an insertion opening, a fixing opening, and an intermediate opening connecting the insertion opening and the fixing opening. The second connecting-link end portion includes a pin fixing opening. The connecting-link intermediate portion interconnects the first connecting-link end portion and the second connecting-link end portion. The connecting-link pin is fixed to the pin fixing opening of the connecting link plate and comprises a connecting-link pin body and a connecting-link pin chromized layer. The connecting-link pin body has a connecting-link pin surface configured to slide relative to the inner link plate in the assembled state of the bicycle chain. The connecting-link pin chromized layer is provided to the connecting-link pin surface of the connecting-link pin to slide relative to the inner link plate in the assembled state of the bicycle chain.

With the bicycle chain according to the twenty-first aspect, the connecting-link pin chromized layer improves wear resistance of the connecting-link pin while the connecting-link plate free of a chromized layer improves productivity of the bicycle chain.

In accordance with a twenty-second aspect of the present invention, the bicycle chain according to any one of the first to twenty-first aspects further comprises an outer link plate and the first chain pin. The outer link plate is free of a chromized layer. The first chain pin is fixed to the outer link plate and comprising a first pin body having a first pin surface configured to slide relative to the inner link plate in the assembled state of the bicycle chain. The first pin surface has pin surface hardness that is equal to or larger than 800 HV.

With the bicycle chain according to the twenty-second aspect, it is possible to improve wear resistance of the bicycle chain In accordance with a twenty-third aspect of the present invention, the bicycle chain according to any one of the first to twenty-second aspects further comprises a connecting link plate and a connecting-link pin. The connecting link plate is free of a chromized layer. The connecting link plate comprises a first connecting-link end portion, a second connecting-link end portion, and a connecting-link intermediate portion. The first connecting-link end portion includes an elongated opening that includes an insertion opening, a fixing opening, and an intermediate opening connecting the insertion opening and the fixing opening. The second connecting-link end portion includes a pin fixing opening. The connecting-link intermediate portion interconnects the first connecting-link end portion and the second connecting-link end portion. The connecting-link pin is fixed to the pin fixing opening of the connecting link plate and has a connecting-link pin surface configured to slide relative to the inner link plate in the assembled state of the bicycle chain. The connecting-link pin surface has connecting-link pin surface hardness that is equal to or larger than 800 HV.

With the bicycle chain according to the twenty-third aspect, the connecting-link pin surface hardness improves wear resistance of the connecting-link pin.

In accordance with a twenty-fourth aspect of the present invention, the bicycle chain according to the second aspect is configured so that the surface hardness is equal to or larger than 900 HV.

With the bicycle chain according to the twenty-fourth aspect, the surface hardness further improves wear resistance of the first axially extending surface and the second axially extending surface which are respectively configured to slide relative to the first chain pin and the second chain pin. Thus, it is possible to further improve wear resistance of the bicycle chain.

In accordance with a twenty-fifth aspect of the present invention, the bicycle chain according to the second aspect is configured so that the surface hardness is equal to or larger than 1000 HV.

With the bicycle chain according to the twenty-fifth aspect, the surface hardness further improves wear resistance of the first axially extending surface and the second axially extending surface which are respectively configured to slide relative to the first chain pin and the second chain pin. Thus, it is possible to further improve wear resistance of the bicycle chain.

In accordance with a twenty-sixth aspect of the present invention, the bicycle chain according to the second aspect is configured so that the first inner-link end portion has a first longitudinally elongated edge in a longitudinal direction with respect to the longitudinal centerline, the first longitudinally elongated edge extending in a first longitudinal direction defined from the second inner-link end portion toward the first inner-link end portion. The first longitudinally elongated edge is configured to support a first sprocket tooth of a bicycle sprocket in the axial direction in an engagement state in which the first sprocket tooth positioned in an outer link space defined between a pair of outer link plates of the bicycle chain.

With the bicycle chain according to the twenty-sixth aspect, the first longitudinally elongated edge reduces falling-off of the bicycle chain from the bicycle sprocket.

In accordance with a twenty-seventh aspect of the present invention, the bicycle chain according to the second aspect is configured so that the second inner-link end portion has a second longitudinally elongated edge in a longitudinal direction with respect to the longitudinal centerline, the second longitudinally elongated edge extending in a second longitudinal direction defined from the first inner-link end portion toward the second inner-link end portion. The second longitudinally elongated edge is configured to support a second sprocket tooth of a bicycle sprocket in the axial direction in an engagement state in which the second sprocket tooth is positioned in an outer link space defined between a pair of outer link plates of the bicycle chain.

With the bicycle chain according to the twenty-seventh aspect, the second longitudinally elongated edge reduces falling-off of the bicycle chain from the bicycle sprocket.

In accordance with a twenty-eighth aspect of the present invention, the bicycle chain according to the second aspect is configured so that the inner link plate has a first inner-link surface and a second inner-link surface opposite to the first inner-link surface in the axial direction. The first inner-link surface is configured to face an axially pairing inner link plate in the axial direction in the assembled state of the bicycle chain. An axial recess is provided to the inner-link intermediate portion in the first inner-link surface.

With the bicycle chain according to the twenty-eighth aspect, the axial recess certainly creates a necessary space between the opposed pair of inner link plates when a distance between the opposed pair of inner link plates decreases for a multiple sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 14 is another enlarged partial cross-sectional view of the bicycle chain in accordance with the modification.

DESCRIPTION OF THE EMBODIMENTS

Figure 1:
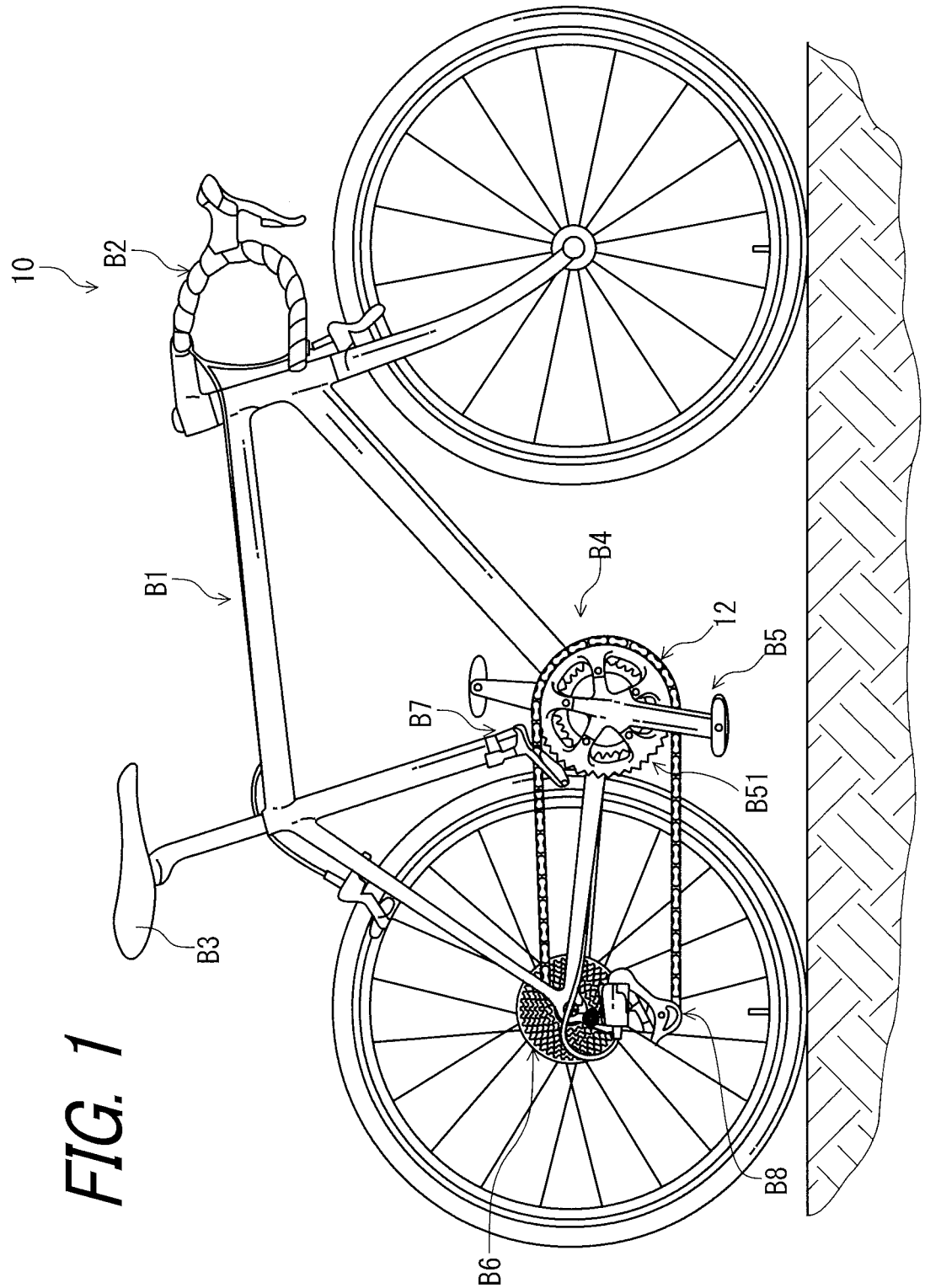
FIG. 1 is a side elevational view of a bicycle having a drive train that uses a bicycle chain in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 is illustrated to be equipped with a bicycle chain 12 in accordance with an embodiment. The bicycle 10 includes a bicycle frame B1, a handlebar B2, a saddle B3, and a drive train B4. The drive train B4 is configured to convert the rider's pedaling force into driving force. The bicycle chain 12 is a part of the drive train B4. The drive train B4 also includes a crank assembly B5, a rear sprocket B6, a front derailleur B7, and a rear derailleur B8. The crank assembly B5 includes a front sprocket B51. The front sprocket B51 can also be referred to as a bicycle sprocket B51. The rear sprocket B6 can also be referred to as a bicycle sprocket B6. The crank assembly B5 is rotatably mounted on a bottom bracket of the bicycle frame B1. The bicycle chain 12 is arranged on the front sprocket B51 and the rear sprocket B6 so as to extend therebetween. The front derailleur B7 and the rear derailleur B8 are configured and arranged to change gears by shifting the bicycle chain 12 in a transverse direction of the bicycle 10.

In this embodiment, the following directional terms "front," "rear," "forward," "rearward," "left," "right," "transverse," "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12, should be interpreted relative to the bicycle chain 12 as mounted on the bicycle 10 used in an upright riding position on a horizontal surface as illustrated in FIG. 1.

Figure 2:
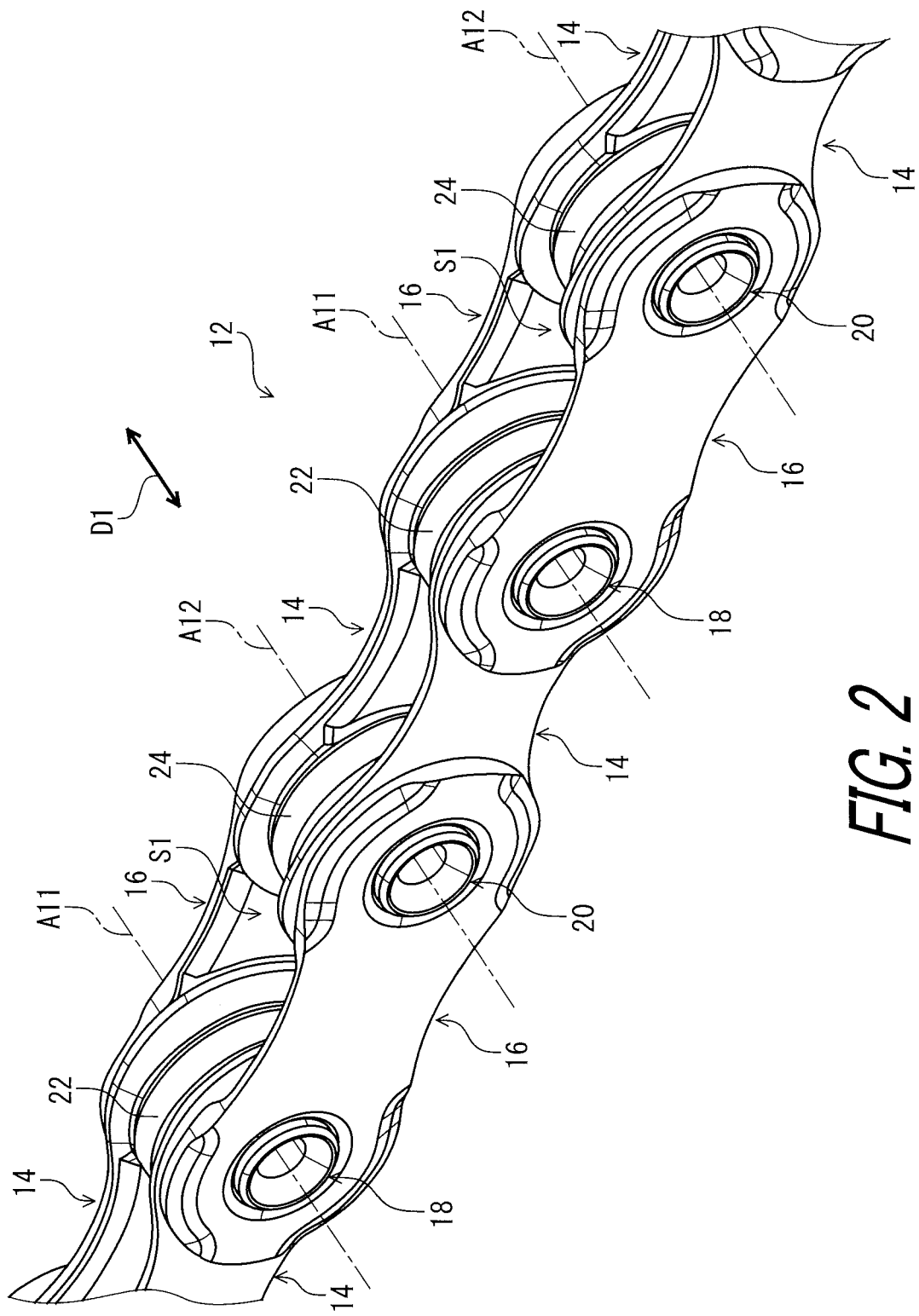
FIG. 2 is a partial perspective view of the bicycle chain.

As seen in FIG. 2, the bicycle chain 12 comprises an inner link plate 14, The bicycle chain 12 further comprises an outer link plate 16 and a chain pin 18. The bicycle chain 12 further comprising a chain pin 20, a first chain roller 22, and a second chain roller 24. The chain pin 18 is fixed to the outer link plate 16. In other words, the first chain pin 18 is fixed to the outer link plate 16. The chain pin 20 is fixed to the outer link plate 16. In other words, the second chain pin 20 is fixed to the outer link plate 16. In this embodiment, the bicycle chain 12 comprises a plurality of inner link plates 14, a plurality of outer link plates 16, a plurality of first chain pins 18, a plurality of second chain pins 20, a plurality of first chain rollers 22, and a plurality of second chain rollers 24. The chain pin 18 can also be referred to as a first chain pin 18. The chain pin 20 can also be referred to as a second chain pin 20.

Figure 3:
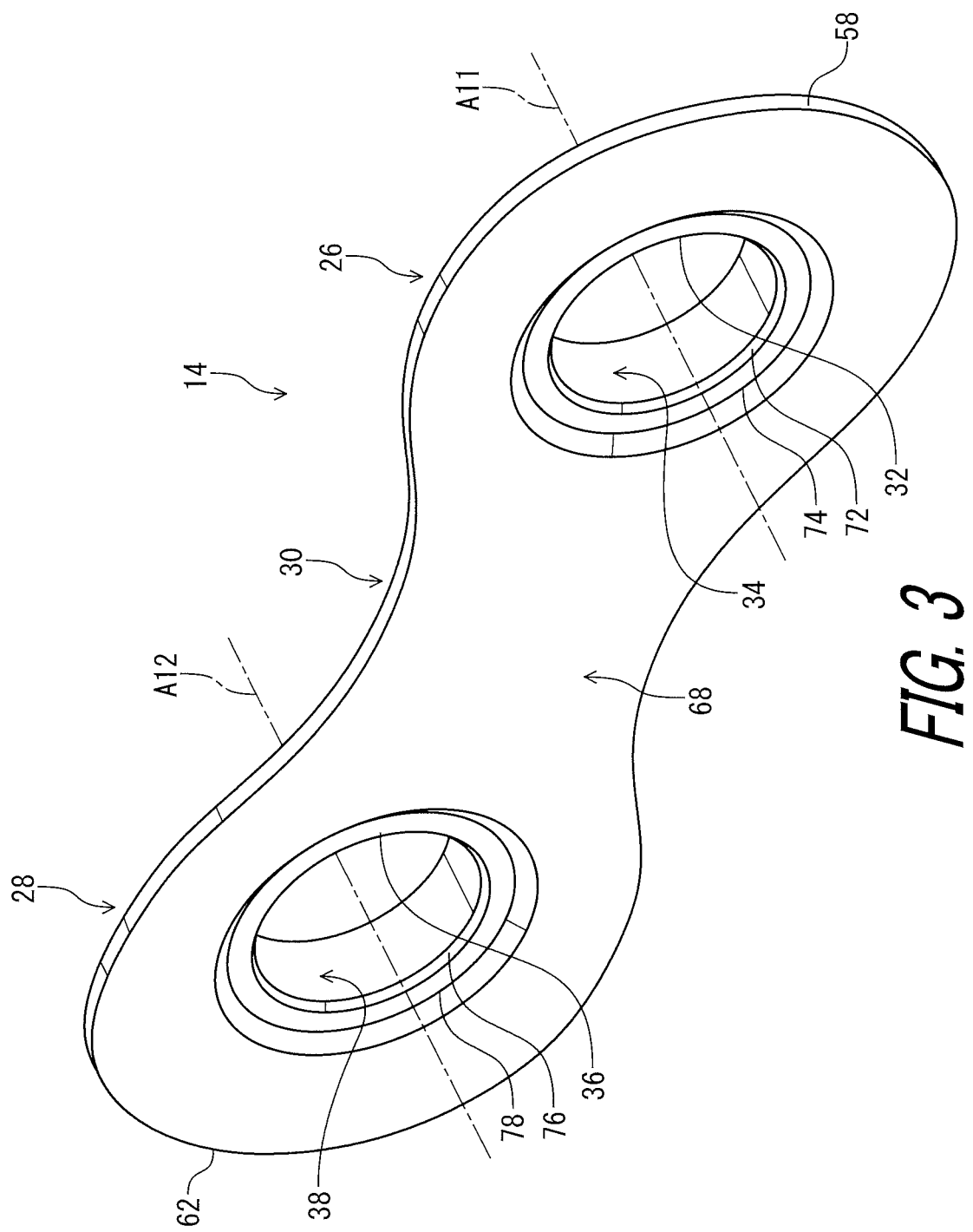
FIG. 3 is a perspective view of an inner link plate of the bicycle chain.

As seen in FIG. 3, the inner link plate 14 comprises a first inner-link end portion 26, a second inner-link end portion 28, and an inner-link intermediate portion 30. The first inner-link end portion 26 includes a first inner-link opening 32 and a first axially extending surface 34. The first inner-link opening 32 has a first inner-link center axis A11. The first axially extending surface 34 circumferentially surrounds the first inner-link opening 32 with respect to the first inner-link center axis A11. The first axially extending surface 34 defines the first inner-link opening 32.

The second inner-link end portion 28 includes a second inner-link opening 36 and a second axially extending surface 38. The second inner-link opening 36 has a second inner-link center axis A12 parallel to the first inner-link center axis A11. The second inner-link center axis A12 can be non-parallel to the first inner-link center axis A11. The second axially extending surface 38 circumferentially surrounds the second inner-link opening 36 with respect to the second inner-link center axis A12. The second axially extending surface 38 defines the second inner-link opening 36.

The inner-link intermediate portion 30 interconnects the first inner-link end portion 26 and the second inner-link end portion 28. The inner-link intermediate portion 30 is provided between the first inner-link end portion 26 and the second inner-link end portion 28.

Figure 4:
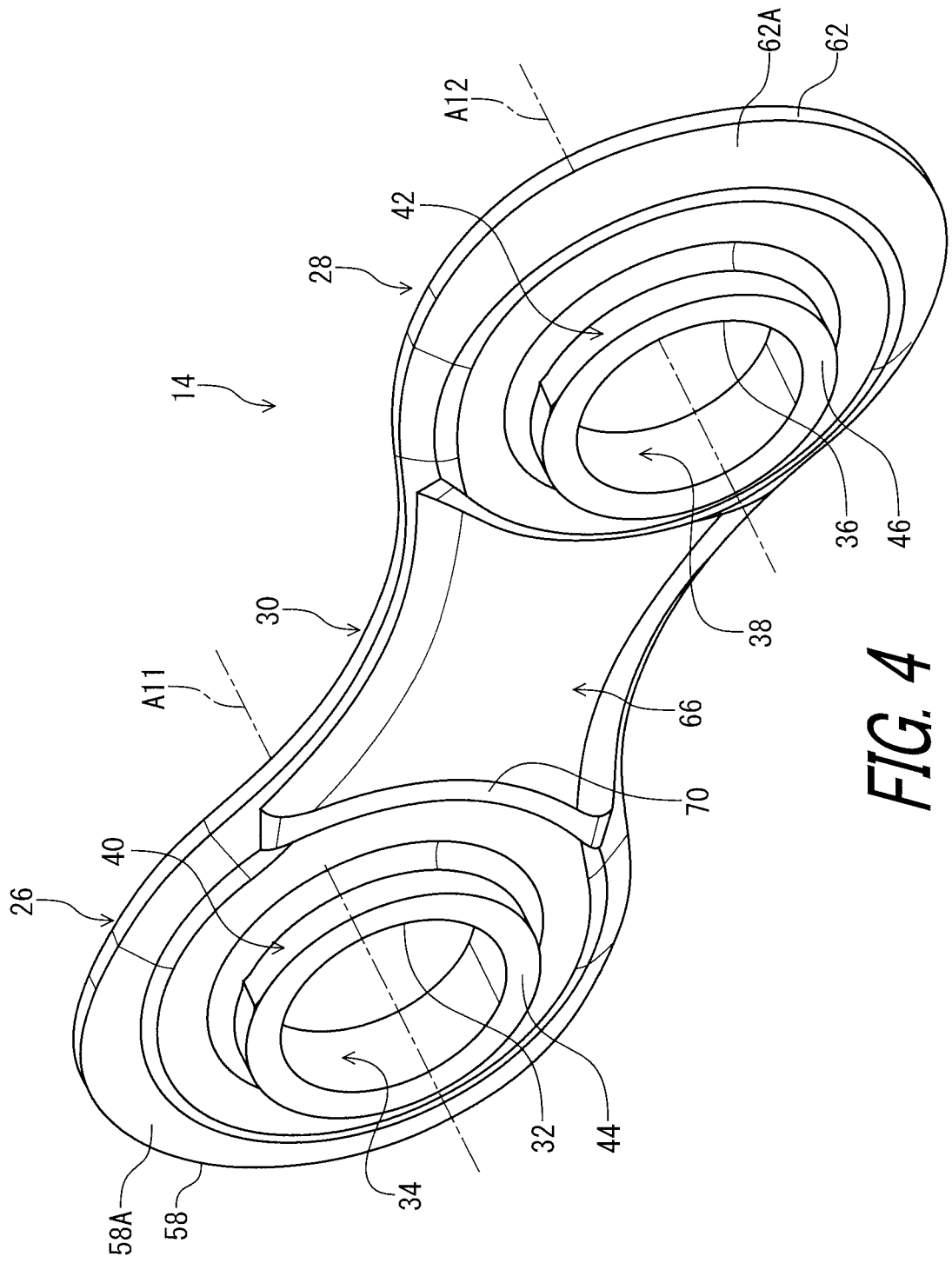
FIG. 4 is another perspective view of the inner link plate of the bicycle chain.

As seen in FIG. 4, the first inner-link end portion 26 includes a third axially extending surface 40 circumferentially surrounding the first inner-link opening 32 with respect to the first inner-link center axis A11. The second inner-link end portion 28 includes a fourth axially extending surface 42 circumferentially surrounding the second inner-link opening 36 with respect to the second inner-link center axis A12. In this embodiment, the first inner-link end portion 26 includes a first roller support 44. The second inner-link end portion 28 includes a second roller support 46. The first roller support 44 has an annular shape and extends along the first inner-link center axis A11. The second roller support 46 has an annular shape and extends along the second inner-link center axis A12.

The first axially extending surface 34 is provided on an inner periphery of the first roller support 44. The second axially extending surface 38 is provided on an inner periphery of the second roller support 46. The third axially extending surface 40 is provided on an outer periphery of the first roller support 44. The fourth axially extending surface 42 is provided on an outer periphery of the second roller support 46.

Figure 5:
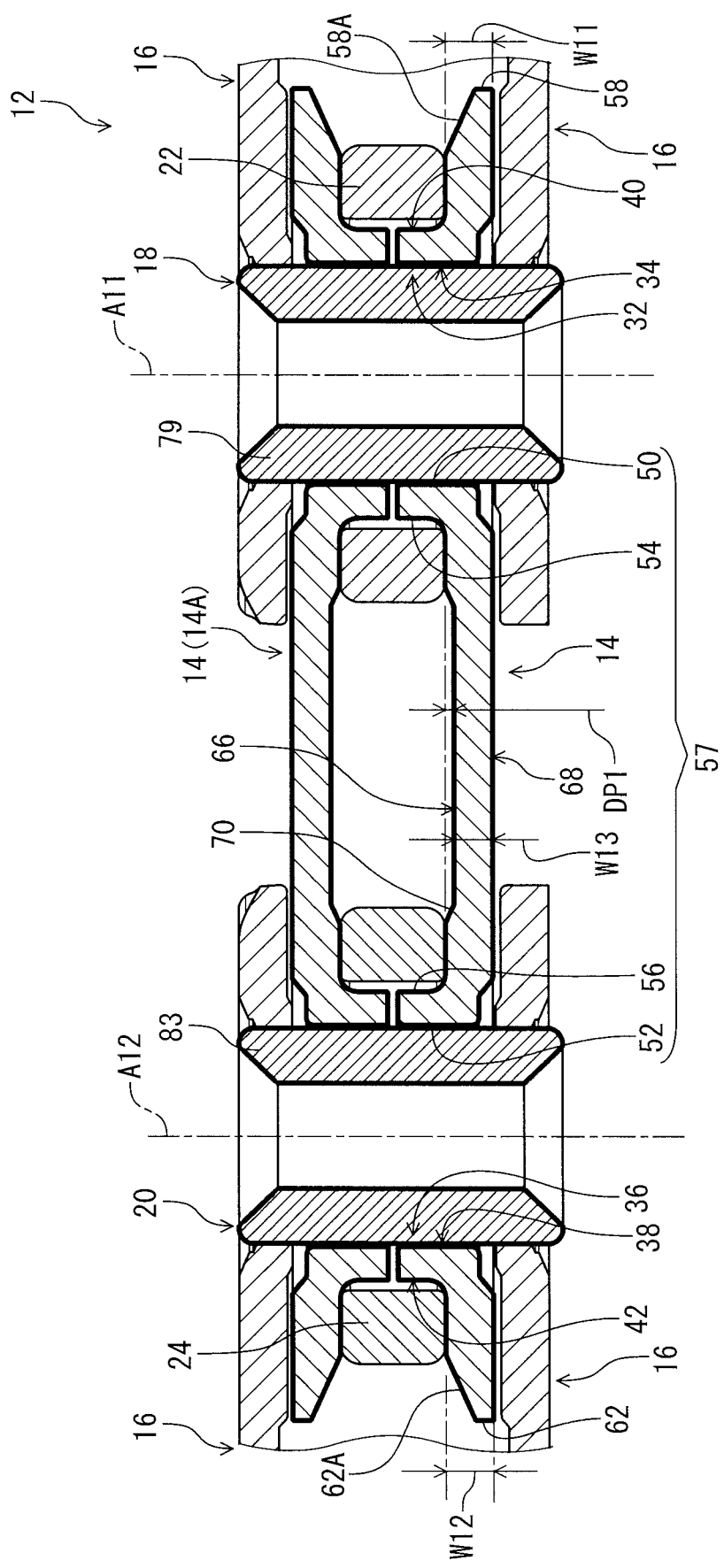
FIG. 5 is a cross-sectional view of the bicycle chain.

As seen in FIG. 5, the first axially extending surface 34 extends parallel to the first inner-link center axis A11 and is configured to slide relative to the first chain pin 18 of the bicycle chain 12 in an assembled state of the bicycle chain 12. The second axially extending surface 38 extends parallel to the second inner-link center axis A12 and is configured to slide relative to the second chain pin 20 of the bicycle chain 12 in the assembled state of the bicycle chain 12.

The third axially extending surface 40 is disposed radially outwardly from the first axially extending surface 34 with respect to the first inner-link center axis A11 and is configured to slide relative to the first chain roller 22 of the bicycle chain 12 in the assembled state of the bicycle chain 12. The fourth axially extending surface 42 is disposed radially outwardly from the second axially extending surface 38 with respect to the second inner-link center axis A12 and is configured to slide relative to the second chain roller 24 of the bicycle chain 12 in the assembled state of the bicycle chain 12.

The inner link plate 14 comprises a first chromized layer 50 and a second chromized layer 52. The first chromized layer 50 is provided to the first axially extending surface 34 to slide relative to the first chain pin 18 of the bicycle chain 12 in the assembled state of the bicycle chain 12. The second chromized layer 52 is provided to the second axially extending surface 38 to slide relative to the second chain pin 20 of the bicycle chain 12 in the assembled state of the bicycle chain 12. The first chromized layer 50 and the second chromized layer 52 are formed by a chromizing process.

In this embodiment, the inner link plate 14 comprises a third chromized layer 54 and a fourth chromized layer 56. The third chromized layer 54 is provided to the third axially extending surface 40 to slide relative to the first chain roller 22 of the bicycle chain 12 in the assembled state of the bicycle chain 12. The fourth chromized layer 56 is provided to the fourth axially extending surface 42 to slide relative to the second chain roller 24 of the bicycle chain 12 in the assembled state of the bicycle chain 12. The third chromized layer 54 and the fourth chromized layer 56 are formed by a chromizing process. However, at least one of the third chromized layer 54 and the fourth chromized layer 56 can be omitted from the inner link plate 14.

In this embodiment, a chromized layer 57 including the first chromized layer 50, the second chromized layer 52, the third chromized layer 54 and the fourth chromized layer 56 is provided to entirety of the inner link plate 14. However, the chromized layer 57 can be at least partly provided to the inner link plate 14. Furthermore, the chromized layer 57 can be omitted from the inner link plate 14. In such embodiments, other surface-hardening treatments can apply to the inner link plate 14 instead of or in addition to chromizing.

Figure 6:
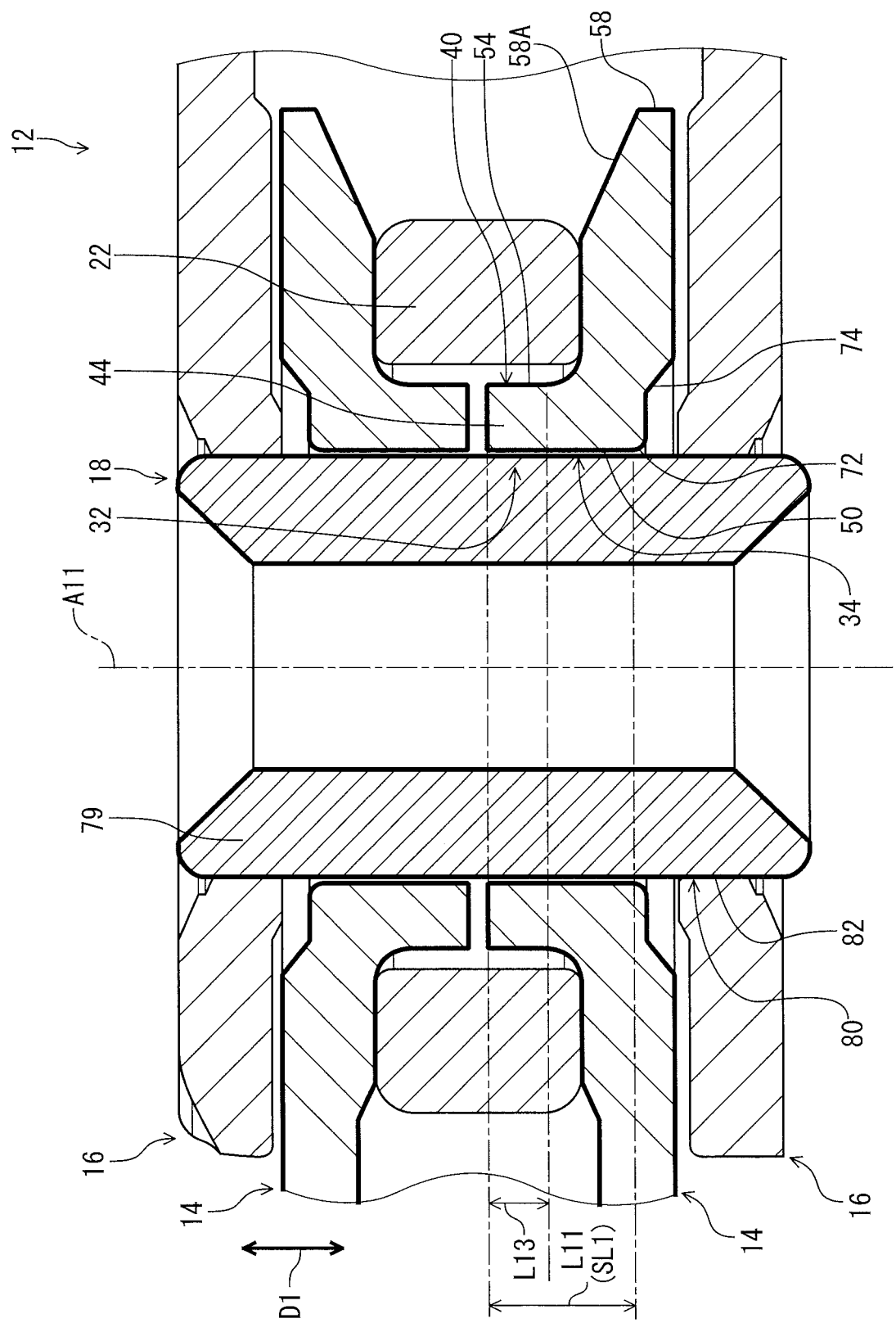
FIG. 6 is an enlarged partial cross-sectional view of the bicycle chain.

As seen in FIG. 6, the first chromized layer 50 has a first maximum axially chromized-treatment length L11 defined in the first axially extending surface 34 in an axial direction D1 with respect to at least one of the first inner-link center axis A11 and the second inner-link center axis A12. The third chromized layer 54 has a third maximum axially chromized-treatment length L13 defined in the third axially extending surface 40 in the axial direction D1. The first maximum axially chromized-treatment length L11 is larger than the third maximum axially chromized-treatment length L13.

The first chromized layer 50 has a first thickness. The first thickness ranges from 2 μm to 20 μm. In this embodiment, for example, the first thickness is 6 μm. However, the first thickness is not limited to this embodiment.

The third chromized layer 54 has a third thickness. The third thickness ranges from 2 μm to 20 μm. In this embodiment, for example, the third thickness is 6 μm. However, the third thickness is not limited to this embodiment.

Figure 7:
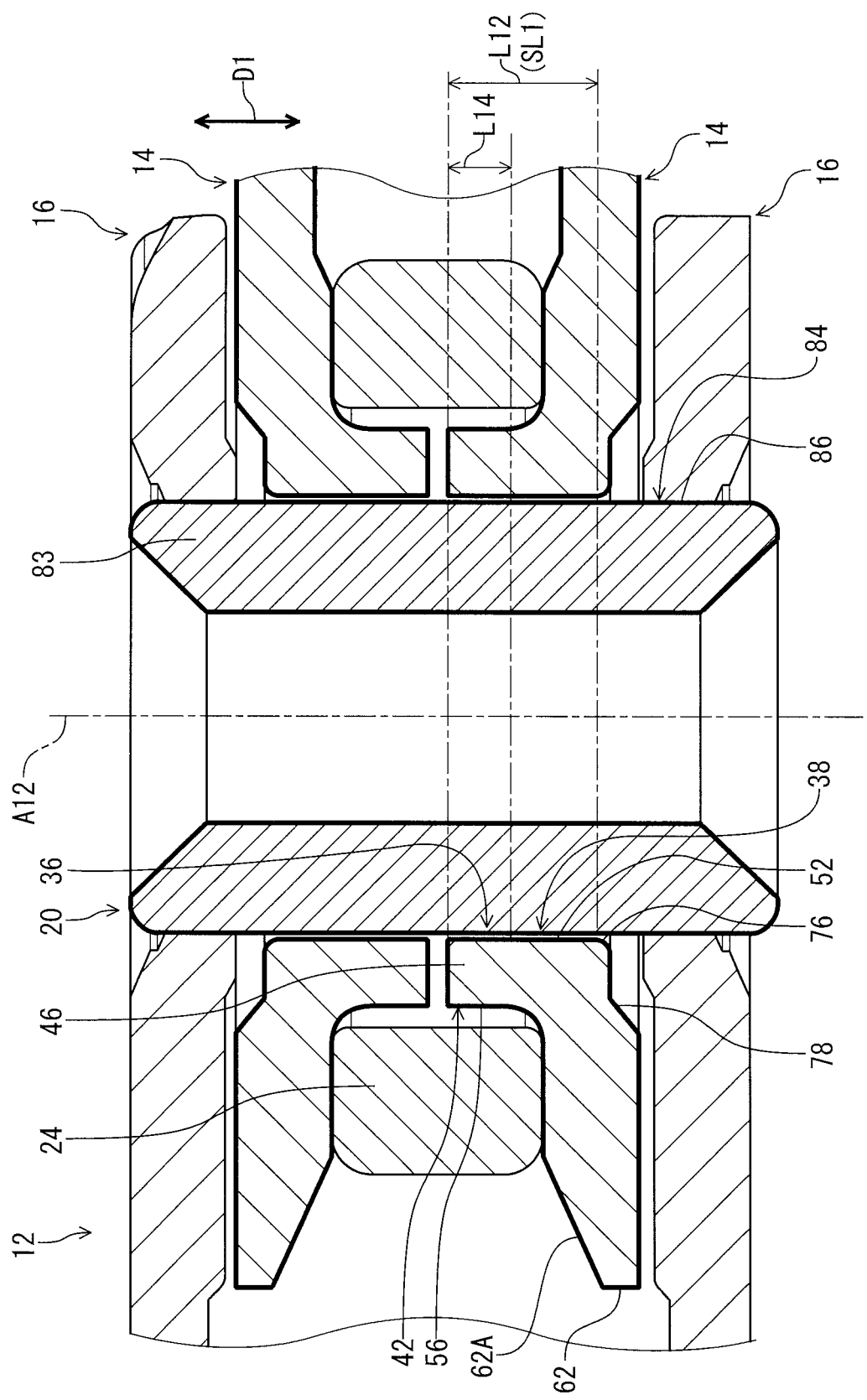
FIG. 7 is another enlarged partial cross-sectional view of the bicycle chain.

As seen in FIG. 7, the second chromized layer 52 has a second maximum axially chromized-treatment length L12 defined in the second axially extending surface 38 in the axial direction D1. The fourth chromized layer 56 has a fourth maximum axially chromized-treatment length L14 defined in the fourth axially extending surface 42 in the axial direction D1. The second maximum axially chromized-treatment length L12 is larger than the fourth maximum axially chromized-treatment length L14.

The second chromized layer 52 has a second thickness. The second thickness ranges from 2 μm to 20 μm. In this embodiment, for example, the second thickness is 6 μm. However, the second thickness is not limited to this embodiment.

The fourth chromized layer 56 has a fourth thickness. The fourth thickness ranges from 2 μm to 20 μm. In this embodiment, for example, the fourth thickness is 6 μm. However, the fourth thickness is not limited to this embodiment.

As seen in FIGS. 6 and 7, each of the first maximum axially chromized-treatment length L11 and the second maximum axially chromized-treatment length L12 is equal to or larger than 1.1 mm. Namely, each of the first axially extending surface 34 and the second axially extending surface 38 has a surface length SL1 equal to or larger than 1.1 mm. Each of the first maximum axially chromized-treatment length L11 and the second maximum axially chromized-treatment length L12 is equal to or smaller than 3.1 mm.

At least one of the first maximum axially chromized-treatment length L11 and the second maximum axially chromized-treatment length L12 ranges from 1.2 mm to 1.32 mm. At least one of the first maximum axially chromized-treatment length L11 and the second maximum axially chromized-treatment length L12 ranges from 1.3 mm to 1.42 mm.

In this embodiment, each of the first maximum axially chromized-treatment length L11 and the second maximum axially chromized-treatment length L12 ranges from 1.2 mm to 1.32 mm. Each of the first maximum axially chromized-treatment length L11 and the second maximum axially chromized-treatment length L12 ranges from 1.3 mm to 1.42 mm. However, each of the first maximum axially chromized-treatment length L11 and the second maximum axially chromized-treatment length L12 is not limited to the above ranges.

Each of the first axially extending surface 34 and the second axially extending surface 38 has the surface hardness equal to or larger than 800 HV. Each of the first chromized layer 50 and the second chromized layer 52 has the surface hardness equal to or larger than 800 HV. The surface hardness is equal to or larger than 900 HV. The surface hardness is equal to or larger than 1000 HV. The surface hardness is equal to or smaller than 3500 HV. The surface hardness can range from 600 HV to 1800 HV. However, the surface hardness is not limited to the above ranges. Preferably, each of the first axially extending surface 34 and the second axially extending surface 38 has a surface length equal to or larger than 1.1 mm.

Figure 8:
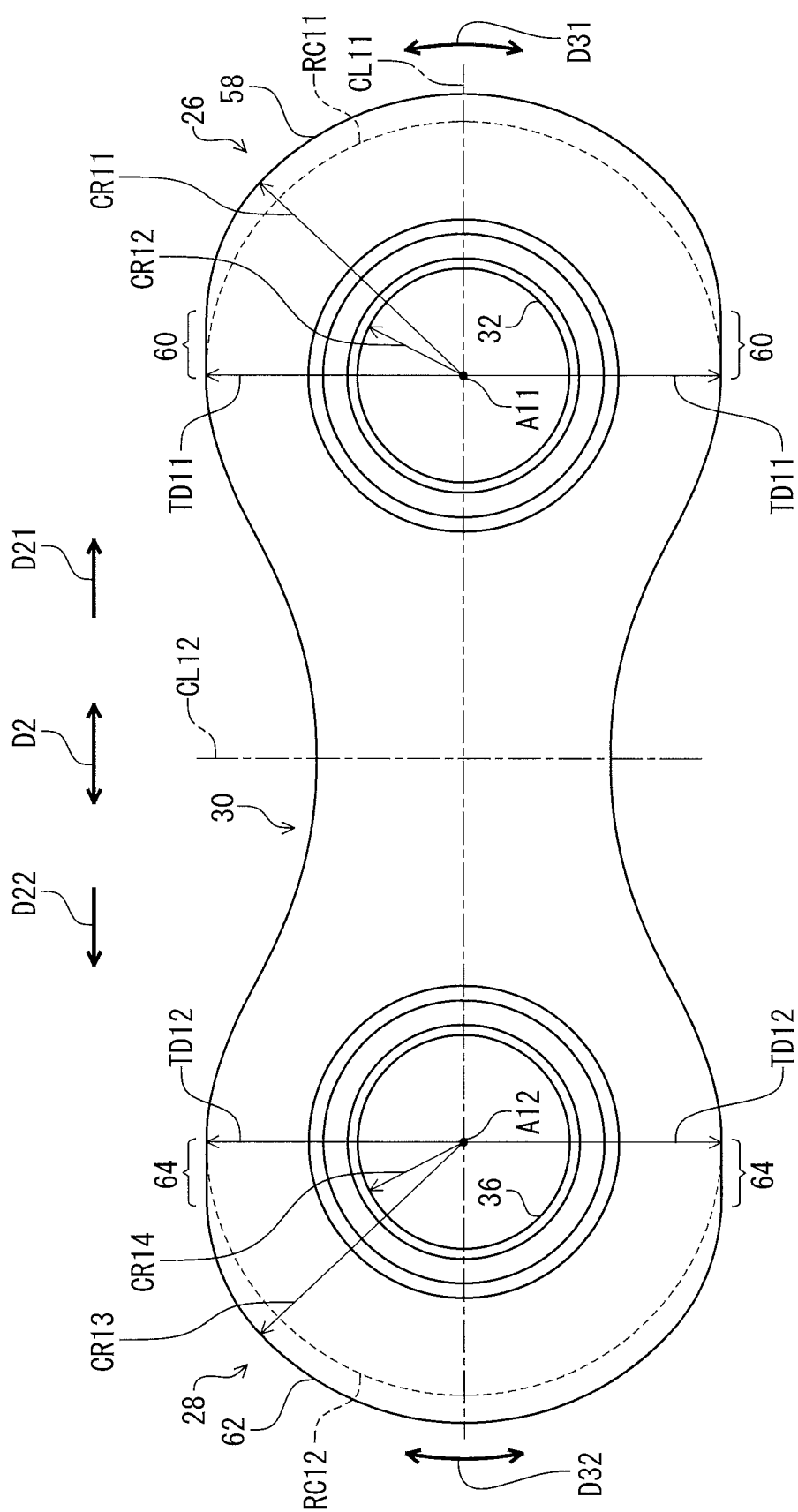
FIG. 8 is a side elevational view of the inner link plate.

As seen in FIG. 8, the inner link plate 14 has a longitudinal centerline CL11 and a transverse centerline CL12 perpendicular to the longitudinal centerline CL11. The longitudinal centerline CL11 is perpendicular to the first inner-link center axis A11 and the second inner-link center axis A12. Preferably, the first inner-link end portion 26 has a first longitudinally elongated edge 58 in a longitudinal direction D2 with respect to the longitudinal centerline CL11. The first longitudinally elongated edge 58 extending in a first longitudinal direction D21 defined from the second inner-link end portion 28 toward the first inner-link end portion 26. Preferably, the first longitudinally elongated edge 58 has a first curvature radius CR11 that is larger than a curvature radius CR12 of the first inner-link opening 32.

The longitudinal direction D2 is parallel to the longitudinal centerline CL11. The first longitudinal direction D21 is parallel to the longitudinal direction D2. The first longitudinally elongated edge 58 is provided radially outwardly of a first reference circular arc RC11 define about the first inner-link center axis A11 when viewed along the first inner-link center axis A11.

The first inner-link end portion 26 has a first maximum transverse distance TD11 defined from the first inner-link center axis A11 to an outer edge of the first inner-link end portion 26 along the transverse centerline CL12. The first maximum transverse distance TD11 is equal to a radius of the first reference circular arc RC11. The first curvature radius CR11 of the first longitudinally elongated edge 58 is larger than the first maximum transverse distance TD11 on the longitudinal centerline CL11.

Preferably, the first inner-link end portion 26 has a pair of first linear edges 60. The pair of first linear edges 60 extends parallel to each other in the longitudinal direction D2 so that the first longitudinally elongated edge 58 is disposed between the pair of first linear edges 60 in a first circumferential direction D31 with respect to the first inner-link center axis A11.

Figure 9:
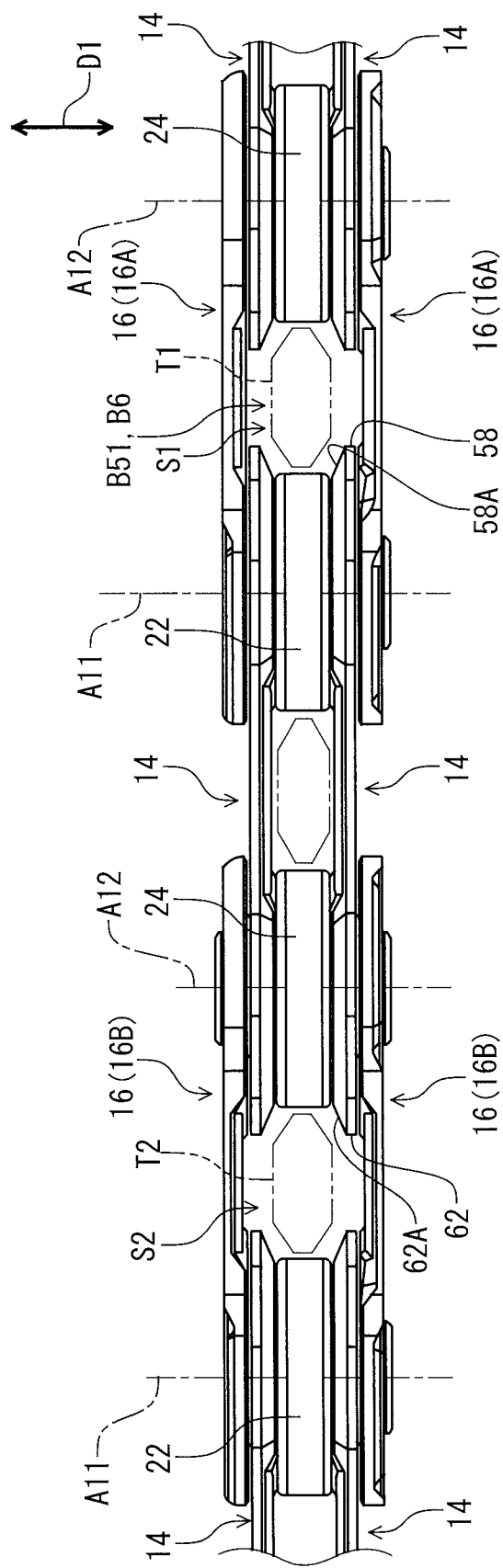
FIG. 9 is a top view of the bicycle chain.

As seen in FIG. 9, the first longitudinally elongated edge 58 is configured to support a first sprocket tooth T1 of the bicycle sprocket B51 or B6 in the axial direction D1 in an engagement state in which the first sprocket tooth T1 is positioned in an outer link space S1 defined between a pair of outer link plates 16 (16A) of the bicycle chain 12. Preferably, the first longitudinally elongated edge 58 has a first chamfered portion 58A that is configured to face the first sprocket tooth T1 in the axial direction D1 in the engagement state.

As seen in FIG. 8, preferably, the second inner-link end portion 28 has a second longitudinally elongated edge 62 in the longitudinal direction D2 with respect to the longitudinal centerline CL11. The second longitudinally elongated edge 62 extends in a second longitudinal direction D22 defined from the first inner-link end portion 26 toward the second inner-link end portion 28. Preferably, the second longitudinally elongated edge 62 has a second curvature radius CR13 that is larger than a curvature radius CR14 of the second inner-link opening 36.

The second longitudinally elongated edge 62 is provided radially outwardly of a second reference circular arc RC12 define about the second inner-link center axis A12 when viewed along the second inner-link center axis A12.

The second inner-link end portion 28 has a second maximum transverse distance TD12 defined from the second inner-link center axis A12 to an outer edge of the second inner-link end portion 28 along the transverse centerline CL12. The second maximum transverse distance TD12 is a radius of the second reference circular arc RC12. The second curvature radius CR13 of the second longitudinally elongated edge 62 is larger than the second maximum transverse distance TD12 on the longitudinal centerline CL11.

Preferably, the second inner-link end portion 28 has a pair of second linear edges 64. The pair of second linear edges 64 extends parallel to each other in the longitudinal direction D2 so that the second longitudinally elongated edge 62 is disposed between the pair of second linear edges 64 in a second circumferential direction D32 with respect to the second inner-link center axis A12.

As seen in FIG. 9, the second longitudinally elongated edge 62 is configured to support a second sprocket tooth T2 of the bicycle sprocket B51 or B6 in the axial direction D1 in an engagement state in which the second sprocket tooth T2 is positioned in an outer link space S2 defined between a pair of outer link plates 16 (16B) of the bicycle chain 12. Preferably, the second longitudinally elongated edge 62 has a second chamfered portion 62A that is configured to face the second sprocket tooth T2 in the axial direction D1 in the engagement state.

As seen in FIG. 5, the inner link plate 14 has a first inner-link surface 66 and a second inner-link surface 68 opposite to the first inner-link surface 66 in the axial direction D1. The first inner-link surface 66 is configured to face an axially pairing inner link plate 14 (14A) in the axial direction D1 in the assembled state of the bicycle chain 12. The first chamfered portion 58A is preferably provided on the first inner-link surface 66. The second chamfered portion 62A is preferably provided on the first inner-link surface 66.

Preferably, an axial recess 70 is provided to the inner-link intermediate portion 30 in the first inner-link surface 66. The first inner-link end portion 26 has a first axial width W11 defined in the axial direction D1. The second inner-link end portion 28 has a second axial width W12 defined in the axial direction D1. The inner-link intermediate portion 30 has an intermediate axial width W13 defined in the axial direction D1. The axial recess 70 is configured so that the intermediate axial width W13 is smaller than each of the first axial width W11 and the second axial width W12. In this embodiment, the first axial width W11 is identical with the second axial width W12. However, the first axial width W11 can be different from the second axial width W12.

The axial recess 70 has an axial depth DP1. The axial depth DP1 is defined in the axial direction D1 between the first inner-link surface 66 in the inner-link intermediate portion 30 and the first inner-link surface 66 in at least one of the first inner-link end portion 26 and the second inner-link end portion 28. The axial depth DP1 ranges from 0.1 mm to 0.2 mm. In this embodiment, for example, the axial depth DP1 is 0.16 mm. However, the axial depth DP1 is not limited to this embodiment and the above range.

As seen in FIG. 3, the second inner-link surface 68 is flat at least except peripheries of the first inner-link opening 32 and the second inner-link opening 36. In this embodiment, the inner link plate 14 includes a first chamfer 72, a first recess 74, a second chamfer 76, and a second recess 78. The first chamfer 72 and the first recess 74 are provided at the periphery of the first inner-link opening 32. The second chamfer 76 and the second recess 78 are provided at the periphery of the second inner-link opening 36.

As seen in FIG. 6, the first maximum axially chromized-treatment length L11 does not include axial lengths of the first chamfer 72 and the first recess 74. As seen in FIG. 7, the second maximum axially chromized-treatment length L12 does not include axial lengths of the second chamfer 76 and the second recess 78.

The chain pin 18 comprises a pin body 79 having a pin surface 80 configured to slide relative to the inner link plate 14. The chain pin 18 comprises a pin chromized layer 82. The pin chromized layer 82 is provided to the pin surface 80 of the chain pin 18 to slide relative to the inner link plate 14 in the assembled state of the bicycle chain 12. The pin surface 80 has pin surface hardness that is equal to or larger than 800 HV. In other words, the first chain pin 18 comprises a first pin body 79 having a first pin surface 80 configured to slide relative to the inner link plate 14 in the assembled state of the bicycle chain 12. The first pin surface 80 has pin surface hardness that is equal to or larger than 800 HV. The pin chromized layer 82 constitutes the pin surface 80. Namely, the pin chromized layer 82 has the pin surface hardness that is equal to or larger than 800 HV. The pin surface hardness is equal to or larger than 900 HV. The pin surface hardness is equal to or larger than 1000 HV. The pin surface hardness is equal to or smaller than 3500 HV. The pin surface hardness can range from 600 HV to 1800 HV. However, the pin surface hardness is not limited to the above ranges.

As seen in FIG. 7, the chain pin 20 comprises a pin body 83 having a pin surface 84 configured to slide relative to the inner link plate 14 in the assembled state of the bicycle chain 12. In other words, the second chain pin 20 comprises a second pin body 83 having a second pin surface 84 configured to slide relative to the inner link plate 14 in the assembled state of the bicycle chain 12. The second pin surface 84 has pin surface hardness that is equal to or larger than 800 HV. The chain pin 20 comprises a pin chromized layer 86. The pin chromized layer 86 is provided to the pin surface 84 of the chain pin 20 to slide relative to the inner link plate 14 in the assembled state of the bicycle chain 12. The pin surface 84 has pin surface hardness that is equal to or larger than 800 HV. The pin chromized layer 86 constitutes the pin surface 84. Namely, the pin chromized layer 86 has the pin surface hardness that is equal to or larger than 800 HV. The pin surface hardness is equal to or larger than 900 HV. The pin surface hardness is equal to or larger than 1000 HV. The pin surface hardness is equal to or smaller than 3500 HV. The pin surface hardness can range from 600 HV to 1800 HV. However, the pin surface hardness is not limited to the above ranges.

As seen in FIG. 5, the outer link plate 16 is free of a chromized layer. However, the outer link plate 16 can include a chromized layer. The outer link plate 16 includes a structure which has been known in the chain field. Thus, it will not be described in detail here for the sake of brevity.

Figure 10:
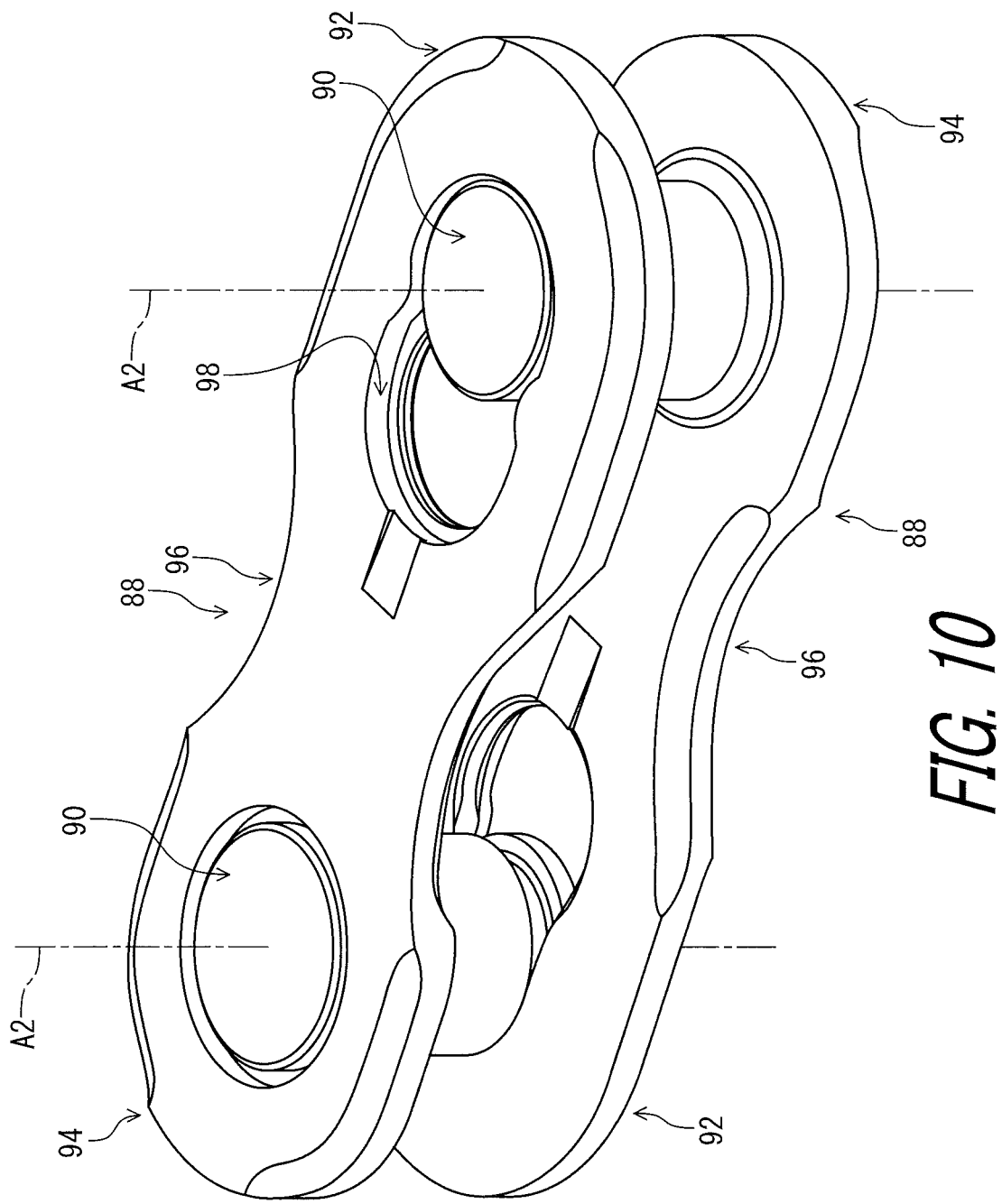
FIG. 10 is a perspective view of connecting-link plates and connecting-link pins of the bicycle chain.

As seen in FIG. 10, the bicycle chain 12 further comprises a connecting link plate 88 and a connecting-link pin 90. The connecting link plate 88 includes a first connecting-link end portion 92, a second connecting-link end portion 94, and a connecting-link intermediate portion 96.

Figure 11:
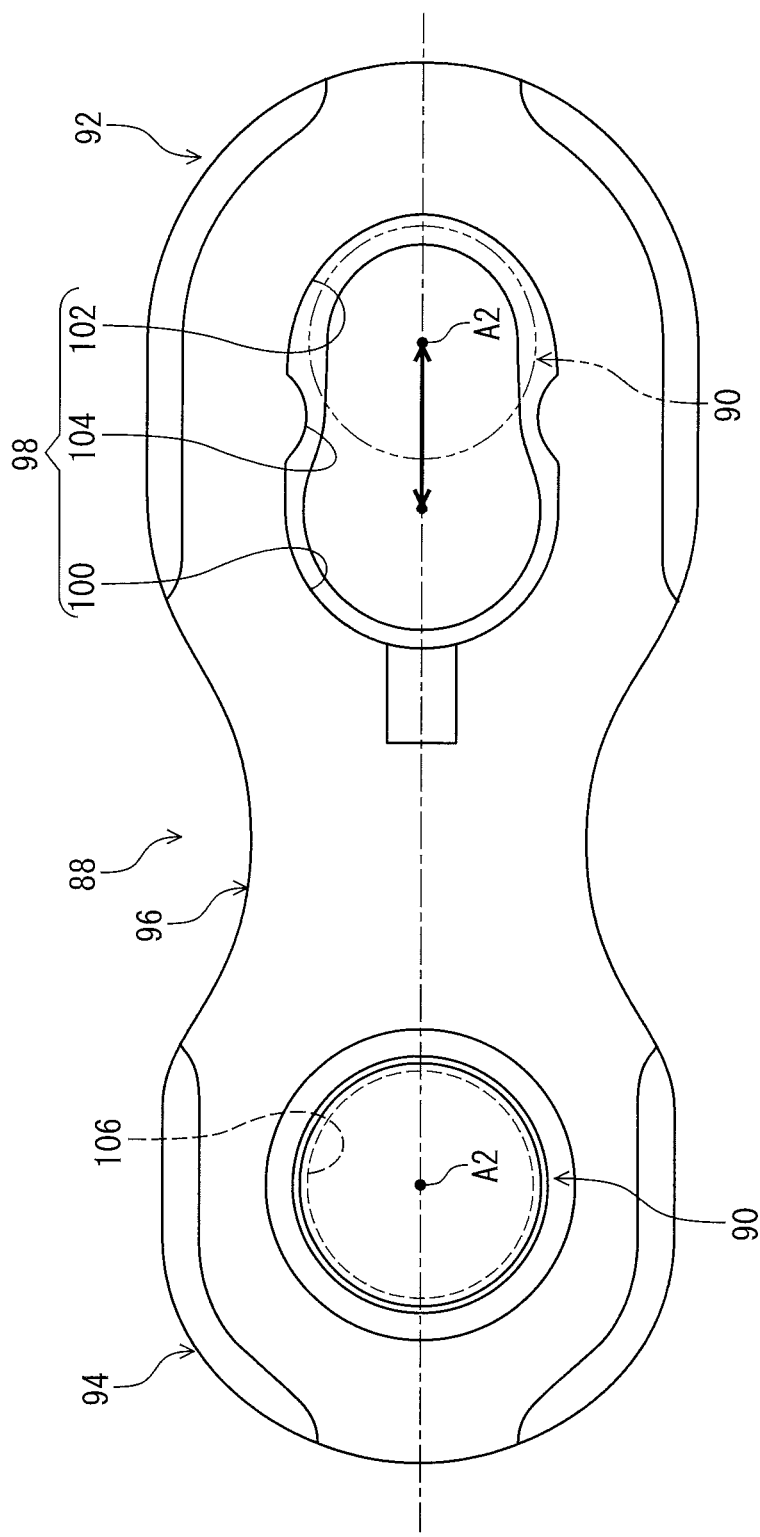
FIG. 11 is a side elevational view of the connecting-link plate and the connecting-link pin.

As seen in FIG. 11, the first connecting-link end portion 92 includes an elongated opening 98. The elongated opening 98 includes an insertion opening 100, a fixing opening 102, and an intermediate opening 104. The intermediate opening 104 connects the insertion opening 100 and the fixing opening 102. The second connecting-link end portion 94 includes a pin fixing opening 106. The connecting-link intermediate portion 96 interconnects the first connecting-link end portion 92 and the second connecting-link end portion 94. The connecting-link intermediate portion 96 is provided between the first connecting-link end portion 92 and the second connecting-link end portion 94.

Figure 12:
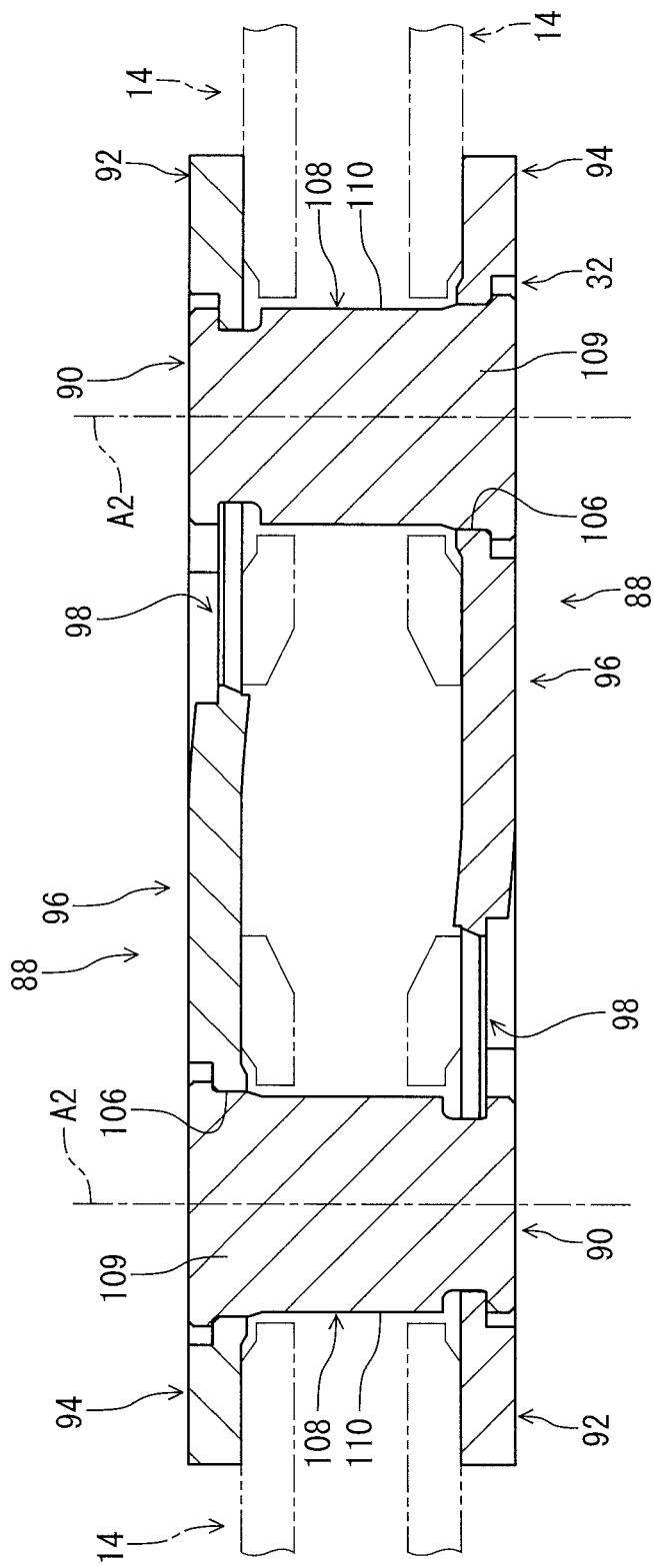
FIG. 12 is a cross-sectional view of the connecting-link plates and the connecting-link pins of the bicycle chain.

As seen in FIG. 12, the connecting-link pin 90 is fixed to the pin fixing opening 106 of the connecting link plate 88 and comprises a connecting-link pin body 109 having a connecting-link pin surface 108 configured to slide relative to the inner link plate 14 in the assembled state of the bicycle chain 12. The connecting-link pin 90 defines a center axis A2.

The connecting link plate 88 is free of a chromized layer. The connecting-link pin 90 comprises a connecting-link pin chromized layer 110. The connecting-link pin chromized layer 110 is provided to the connecting-link pin surface 108 to slide relative to the inner link plate 14 in the assembled state of the bicycle chain 12. The connecting-link pin surface 108 has connecting-link pin surface hardness that is equal to or larger than 800 HV. The connecting-link pin chromized layer 110 constitutes the connecting-link pin surface 108. Thus, the connecting-link pin chromized layer 110 has the connecting-link pin surface hardness that is equal to or larger than 800 HV. The connecting-link pin surface hardness is equal to or larger than 900 HV. The connecting-link pin surface hardness is equal to or larger than 1000 HV. The connecting-link pin surface hardness is equal to or smaller than 3500 HV. The connecting-link pin surface hardness can range from 600 HV to 1800 HV. However, the connecting-link pin surface hardness is not limited to the above ranges.

A method of manufacturing the inner link plate 14 will be described below. The method of manufacturing the inner link plate 14 includes (1) press working, (2) barreling, (3) carburizing, (4) barreling, (5) chromizing, (6) quenching, (7) tempering, and (8) barreling. In the chromizing, for example, a barreled plate is put into powders including chromium (e.g., 98%) and ammonium chloride (e.g., 2%), and the powders with the plate is heated in an electric furnace under 1000 degrees Celsius for three hours. The plate is taken out from the powders after being cooled and is heated under 860 degrees Celsius for 45 minutes. After chromizing, the plate is hardened by quenching (e.g., oil quenching) and is subjected to tempering under 320 degrees Celsius for 90 minutes. Thus, each of the chromized layer 57, the pin chromized layer 82, the pin chromized layer 86, and the connecting-link pin chromized layer 110 includes chromium.

Modifications

Figure 13:
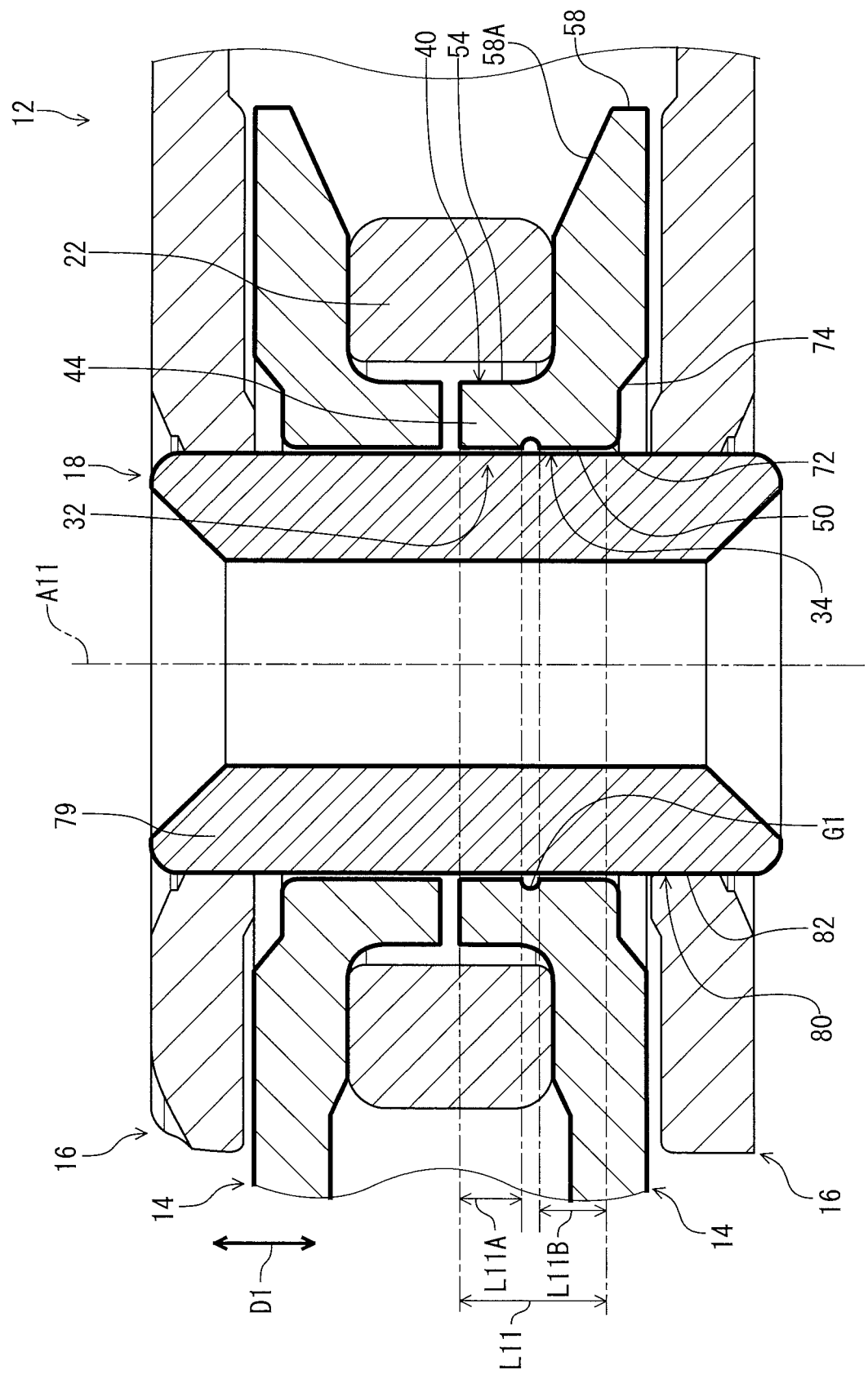
FIG. 13 is an enlarged partial cross-sectional view of a bicycle chain in accordance with a modification.

As seen in FIG. 13, for example, the first maximum axially chromized-treatment length L11 can be a maximum total length of the first chromized layer 50 in the axial direction D1 when the first chromized layer 50 is divided by a first groove G1 in the axial direction D1. In such an embodiment, the first maximum axially chromized-treatment length L11 does not include an axial width of the first groove G1. The first maximum axially chromized-treatment length L11 is the sum of axially chromized-treatment lengths L11A and L11B. The same concept can apply to the third maximum axially chromized-treatment length L13.

As seen in FIG. 14, for example, the second maximum axially chromized-treatment length L12 can be a maximum total length of the second chromized layer 52 in the axial direction D1 when the second chromized layer 52 is divided by a second groove G2 in the axial direction D1. In such an embodiment, the second maximum axially chromized-treatment length L12 does not include an axial width of the second groove. The second maximum axially chromized-treatment length L12 is the sum of axially chromized-treatment lengths L12A and L12B. The same concept can apply to the fourth maximum axially chromized-treatment length L14.

In the above embodiment, the inner link plate 14 includes the chromized layer 57. The chain pin 18 includes the pin chromized layer 82. The chain pin 20 includes the pin chromized layer 86. The connecting-link pin 90 includes the connecting-link pin chromized layer 110. However, at least one of the inner link plate 14, the chain pin 18, the chain pin 20, and the connecting-link pin 90 can be subjected to other surface-hardening treatments instead of chromizing. For example, at least one of the inner link plate 14, the chain pin 18, the chain pin 20, and the connecting-link pin 90 can be subjected to other diffusion treatments such as titanizing, calorizing, siliconizing, boronizing, and nitriding. Surface hardness of a surface subjected to titanizing ranges 2000 HV to 3000 HV. Surface hardness of a surface subjected to nitriding is equal to or smaller than 1100 HV. Surface hardness of a surface subjected to the above treatments is equal to or smaller than 3500 HV.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle chain comprising:
an inner link plate having a longitudinal centerline and a transverse centerline perpendicular to the longitudinal centerline, the inner link plate comprising:
a first inner-link end portion including:
a first inner-link opening having a first inner-link center axis; and a first axially extending surface circumferentially surrounding the first inner-link opening with respect to the first inner-link center axis, the first axially extending surface extending parallel to the first inner-link center axis and configured to slide relative to a first chain pin of the bicycle chain in an assembled state of the bicycle chain;

a second inner-link end portion including:
  a second inner-link opening having a second inner-link center axis parallel to the first inner-link center axis; and
  a second axially extending surface circumferentially surrounding the second inner-link opening with respect to the second inner-link center axis, the second axially extending surface extending parallel to the second inner-link center axis and configured to slide relative to a second chain pin of the bicycle chain in the assembled state of the bicycle chain;

an inner-link intermediate portion interconnecting the first inner-link end portion and the second inner-link end portion;

a first chromized layer provided to the first axially extending surface to slide relative to the first chain pin of the bicycle chain in the assembled state of the bicycle chain, the first chromized layer having a first maximum axially chromized-treatment length defined in the first axially extending surface in an axial direction with respect to at least one of the first inner-link center axis and the second inner-link center axis; and a second chromized layer provided to the second axially extending surface to slide relative to the second chain pin of the bicycle chain in the assembled state of the bicycle chain, the second chromized layer having a second maximum axially chromized-treatment length defined in the second axially extending surface in the axial direction; and each of the first maximum axially chromized-treatment length and the second maximum axially chromized-treatment length being equal to or larger than 1.1 mm.

2. A bicycle chain comprising:
an inner link plate having a longitudinal centerline and a transverse centerline perpendicular to the longitudinal centerline, the inner link plate comprising:
  a first inner-link end portion including:
    a first inner-link opening having a first inner-link center axis; and
    a first axially extending surface circumferentially surrounding the first inner-link opening with respect to the first inner-link center axis, the first axially extending surface extending parallel to first inner-link center axis and configured to slide relative to a first chain pin of the bicycle chain in an assembled state of the bicycle chain;
  a second inner-link end portion including:
    a second inner-link opening having a second inner-link center axis parallel to the first inner-link center axis; and
    a second axially extending surface circumferentially surrounding the second inner-link opening with respect to the second inner-link center axis, the second axially extending surface extending parallel to first inner-link center axis and configured to slide relative to a second chain pin of the bicycle chain in the assembled state of the bicycle chain; and an inner-link intermediate portion interconnecting the first inner-link end portion and the second inner-link end portion;
each of the first axially extending surface and the second axially extending surface having a surface length equal to or larger than 1.1 mm and surface hardness equal to or larger than 800 HV.

3. The bicycle chain according to claim 1, wherein
at least one of the first maximum axially chromized-treatment length and the second maximum axially chromized-treatment length ranges from 1.2 mm to 1.32 mm.

4. The bicycle chain according to claim 1, wherein
at least one of the first maximum axially chromized-treatment length and the second maximum axially chromized-treatment length ranges from 1.3 mm to 1.42 mm.

5. The bicycle chain according to claim 1, wherein
the first inner-link end portion includes a third axially extending surface circumferentially surrounding the first inner-link opening with respect to the first inner-link center axis,
the third axially extending surface is disposed radially outwardly from the first axially extending surface with respect to the first inner-link center axis and is configured to slide relative to a first chain roller of the bicycle chain in the assembled state of the bicycle chain,
the second inner-link end portion includes a fourth axially extending surface circumferentially surrounding the second inner-link opening with respect to the second inner-link center axis,
the fourth axially extending surface is disposed radially outwardly from the second axially extending surface with respect to the second inner-link center axis and is configured to slide relative to a second chain roller of the bicycle chain in the assembled state of the bicycle chain, and
the inner link plate comprises:
  a third chromized layer provided to the third axially extending surface to slide relative to the first chain roller of the bicycle chain in the assembled state of the bicycle chain; and
  a fourth chromized layer provided to the fourth axially extending surface to slide relative to the second chain roller of the bicycle chain in the assembled state of the bicycle chain.

6. The bicycle chain according to claim 5, wherein
a chromized layer including the first chromized layer, the second chromized layer, the third chromized layer and the fourth chromized layer is provided to entirety of the inner link plate.

7. The bicycle chain according to claim 1, wherein
the first inner-link end portion has a first longitudinally elongated edge in a longitudinal direction with respect to the longitudinal centerline, the first longitudinally elongated edge extending in a first longitudinal direction defined from the second inner-link end portion toward the first inner-link end portion, and
the first longitudinally elongated edge is configured to support a first sprocket tooth of a bicycle sprocket in the axial direction in an engagement state in which the first sprocket tooth positioned in an outer link space defined between a pair of outer link plates of the bicycle chain.

8. The bicycle chain according to claim 7, wherein
the first inner-link end portion has a pair of first linear edges extending parallel to each other in the longitudinal direction so that the first longitudinally elongated edge is disposed between the pair of first linear edges in a first circumferential direction with respect to the first inner-link center axis.

9. The bicycle chain according to claim 7, wherein the first longitudinally elongated edge has a first chamfered portion that is configured to face the first sprocket tooth in the axial direction in the engagement state.

10. The bicycle chain according to claim 7, wherein the first longitudinally elongated edge has a first curvature radius that is larger than a curvature radius of the first inner-link opening.

11. The bicycle chain according to claim 1, wherein the second inner-link end portion has a second longitudinally elongated edge in a longitudinal direction with respect to the longitudinal centerline, the second longitudinally elongated edge extending in a second longitudinal direction defined from the first inner-link end portion toward the second inner-link end portion, and the second longitudinally elongated edge is configured to support a second sprocket tooth of a bicycle sprocket in the axial direction in an engagement state in which the second sprocket tooth is positioned in an outer link space defined between a pair of outer link plates of the bicycle chain.

12. The bicycle chain according to claim 11, wherein the second inner-link end portion has a pair of second linear edges extending parallel to each other in the longitudinal direction so that the second longitudinally elongated edge is disposed between the pair of second linear edges in a second circumferential direction with respect to the second inner-link center axis.

13. The bicycle chain according to claim 11, wherein the second longitudinally elongated edge has a second chamfered portion that is configured to face the second sprocket tooth in the axial direction in the engagement state.

14. The bicycle chain according to claim 11, wherein the second longitudinally elongated edge has a second curvature radius that is larger than a curvature radius of the second inner-link opening.

15. The bicycle chain according to claim 1, wherein the inner link plate has a first inner-link surface and a second inner-link surface opposite to the first inner-link surface in the axial direction,
the first inner-link surface configured to face an axially pairing inner link plate in the axial direction in the assembled state of the bicycle chain, and
an axial recess is provided to the inner-link intermediate portion in the first inner-link surface.

16. The bicycle chain according to claim 15, wherein the first inner-link end portion has a first axial width defined in the axial direction,
the second inner-link end portion has a second axial width defined in the axial direction,
the inner-link intermediate portion has an intermediate axial width defined in the axial direction, and
the axial recess is configured so that the intermediate axial width is smaller than each of the first axial width and the second axial width.

17. The bicycle chain according to claim 16, wherein the first axial width is identical with the second axial width.

18. The bicycle chain according to claim 15, wherein the second inner-link surface is flat at least except peripheries of the first inner-link opening and the second inner-link opening.

19. The bicycle chain according to claim 15, wherein the axial recess has an axial depth defined in the axial direction between the first inner-link surface in the inner-link intermediate portion and the first inner-link surface in at least one of the first inner-link end portion and the second inner-link end portion, and
the axial depth ranges from 0.1 mm to 0.2 mm.

20. The bicycle chain according to claim 1, further comprising:
an outer link plate that is free of a chromized layer; and
a chain pin fixed to the outer link plate and comprising:
a pin body having a pin surface configured to slide relative to the inner link plate in the assembled state of the bicycle chain; and
a pin chromized layer provided to the pin surface of the chain pin to slide relative to the inner link plate in the assembled state of the bicycle chain.

21. The bicycle chain according to claim 1, further comprising:
a connecting link plate that is free of a chromized layer, the connecting link plate including:
a first connecting-link end portion including an elongated opening that includes an insertion opening, a fixing opening, and an intermediate opening connecting the insertion opening and the fixing opening;
a second connecting-link end portion including a pin fixing opening; and
a connecting-link intermediate portion interconnecting the first connecting-link end portion and the second connecting-link end portion; and
a connecting-link pin fixed to the pin fixing opening of the connecting link plate and comprising:
a connecting-link pin body having a connecting-link pin surface configured to slide relative to the inner link plate in the assembled state of the bicycle chain; and
a connecting-link pin chromized layer provided to the connecting-link pin surface of the connecting-link pin to slide relative to the inner link plate in the assembled state of the bicycle chain.

22. The bicycle chain according to claim 2, further comprising:
an outer link plate that is free of a chromized layer; and
the first chain pin fixed to the outer link plate and comprising a first pin body having a first pin surface configured to slide relative to the inner link plate in the assembled state of the bicycle chain, wherein
the first pin surface has pin surface hardness that is equal to or larger than 800 HV.

23. The bicycle chain according to claim 2, further comprising
a connecting link plate that is free of a chromized layer, the connecting link plate comprising:
a first connecting-link end portion including an elongated opening that includes an insertion opening, a fixing opening, and an intermediate opening connecting the insertion opening and the fixing opening;
a second connecting-link end portion including a pin fixing opening; and
a connecting-link intermediate portion interconnecting the first connecting-link end portion and the second connecting-link end portion; and
a connecting-link pin fixed to the pin fixing opening of the connecting link plate and having a connecting-link pin surface configured to slide relative to the inner link plate in the assembled state of the bicycle chain, wherein the connecting-link pin surface has connecting-link pin surface hardness that is equal to or larger than 800 HV.

24. The bicycle chain according to claim 2, wherein the surface hardness is equal to or larger than 900 HV.

25. The bicycle chain according to claim 2, wherein the surface hardness is equal to or larger than 1000 HV.

26. The bicycle chain according to claim 2, wherein the first inner-link end portion has a first longitudinally elongated edge in a longitudinal direction with respect to the longitudinal centerline, the first longitudinally elongated edge extending in a first longitudinal direction defined from the second inner-link end portion toward the first inner-link end portion, and the first longitudinally elongated edge is configured to support a first sprocket tooth of a bicycle sprocket in the axial direction in an engagement state in which the first sprocket tooth positioned in an outer link space defined between a pair of outer link plates of the bicycle chain.

27. The bicycle chain according to claim 2, wherein the second inner-link end portion has a second longitudinally elongated edge in a longitudinal direction with respect to the longitudinal centerline, the second longitudinally elongated edge extending in a second longitudinal direction defined from the first inner-link end portion toward the second inner-link end portion, and the second longitudinally elongated edge is configured to support a second sprocket tooth of a bicycle sprocket in the axial direction in an engagement state in which the second sprocket tooth is positioned in an outer link space defined between a pair of outer link plates of the bicycle chain.

28. The bicycle chain according to claim 2, wherein the inner link plate has a first inner-link surface and a second inner-link surface opposite to the first inner-link surface in the axial direction, the first inner-link surface is configured to face an axially pairing inner link plate in the axial direction in the assembled state of the bicycle chain, and an axial recess is provided to the inner-link intermediate portion in the first inner-link surface.

\* \* \* \* \*